(12) United States Patent
Kb et al.

(10) Patent No.: US 11,818,574 B2
(45) Date of Patent: Nov. 14, 2023

(54) PROVISIONING DEVICES SECURELY USING ZERO TOUCH DEPLOYMENTS

(71) Applicant: Citrix Systems, Inc., Fort Lauderdale, FL (US)

(72) Inventors: Krishna Kumar Kb, Bengaluru (IN); Praveen Raja Dhanabalan, Bengaluru (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 349 days.

(21) Appl. No.: 17/331,993

(22) Filed: May 27, 2021

(65) Prior Publication Data

US 2022/0386124 A1 Dec. 1, 2022

(51) Int. Cl.
| | |
|---|---|
| *H04L 29/06* | (2006.01) |
| *H04W 12/069* | (2021.01) |
| *H04W 4/80* | (2018.01) |
| *H04W 12/04* | (2021.01) |
| *H04L 9/32* | (2006.01) |

(52) U.S. Cl.
CPC ......... *H04W 12/069* (2021.01); *H04L 9/3263* (2013.01); *H04W 4/80* (2018.02); *H04W 12/04* (2013.01)

(58) Field of Classification Search
CPC ..... H04W 12/069; H04W 4/80; H04W 12/04; H04L 9/3263
See application file for complete search history.

(56) References Cited

U.S. PATENT DOCUMENTS

| | | | |
|---|---|---|---|
| 8,353,041 B2 * | 1/2013 | Brown ................. | G06F 21/562 713/153 |
| 2004/0127277 A1 * | 7/2004 | Walker .................. | H04L 63/08 463/16 |
| 2007/0150744 A1 * | 6/2007 | Cheng .................. | G06F 21/335 713/183 |

(Continued)

FOREIGN PATENT DOCUMENTS

| | | | | |
|---|---|---|---|---|
| CN | 103345134 B | * | 1/2016 | ......... G03G 15/0863 |
| CN | 105827621 A | * | 8/2016 | |

(Continued)

*Primary Examiner* — Shawnchoy Rahman

(57) ABSTRACT

Described embodiments provide for provisioning devices securely using zero touch deployments. A controller application can receive a first authentication code from the controller. The controller application can establish, responsive to receiving the first authentication code, a short-range wireless connection with the device within a pairing range of the controller application using at least one of one or more short-range wireless communication types. The controller application can receive a second authentication code from the device via the short-range wireless connection. The controller application can determine that the first authentication code received from the controller corresponds to the second authentication code received via the short-range wireless connection. The controller application can transmit, responsive to determining that the first authentication code corresponds to the second authentication code, an approval request to the controller to sign a certificate to authorize the device to communicate with the controller.

20 Claims, 13 Drawing Sheets

(56) References Cited

U.S. PATENT DOCUMENTS

2015/0012968 A1\* 1/2015 Sugahara ............ G06F 12/1408
726/2
2015/0286585 A1\* 10/2015 Caraccio ............. G06F 12/1458
713/189
2017/0302640 A1\* 10/2017 Maletsky .............. H04L 9/3242

FOREIGN PATENT DOCUMENTS

CN 111709007 A \* 9/2020
CN 111741011 A \* 10/2020 ......... H04L 63/0838
WO WO-9934553 A1 \* 7/1999 ......... H04L 63/0464

\* cited by examiner

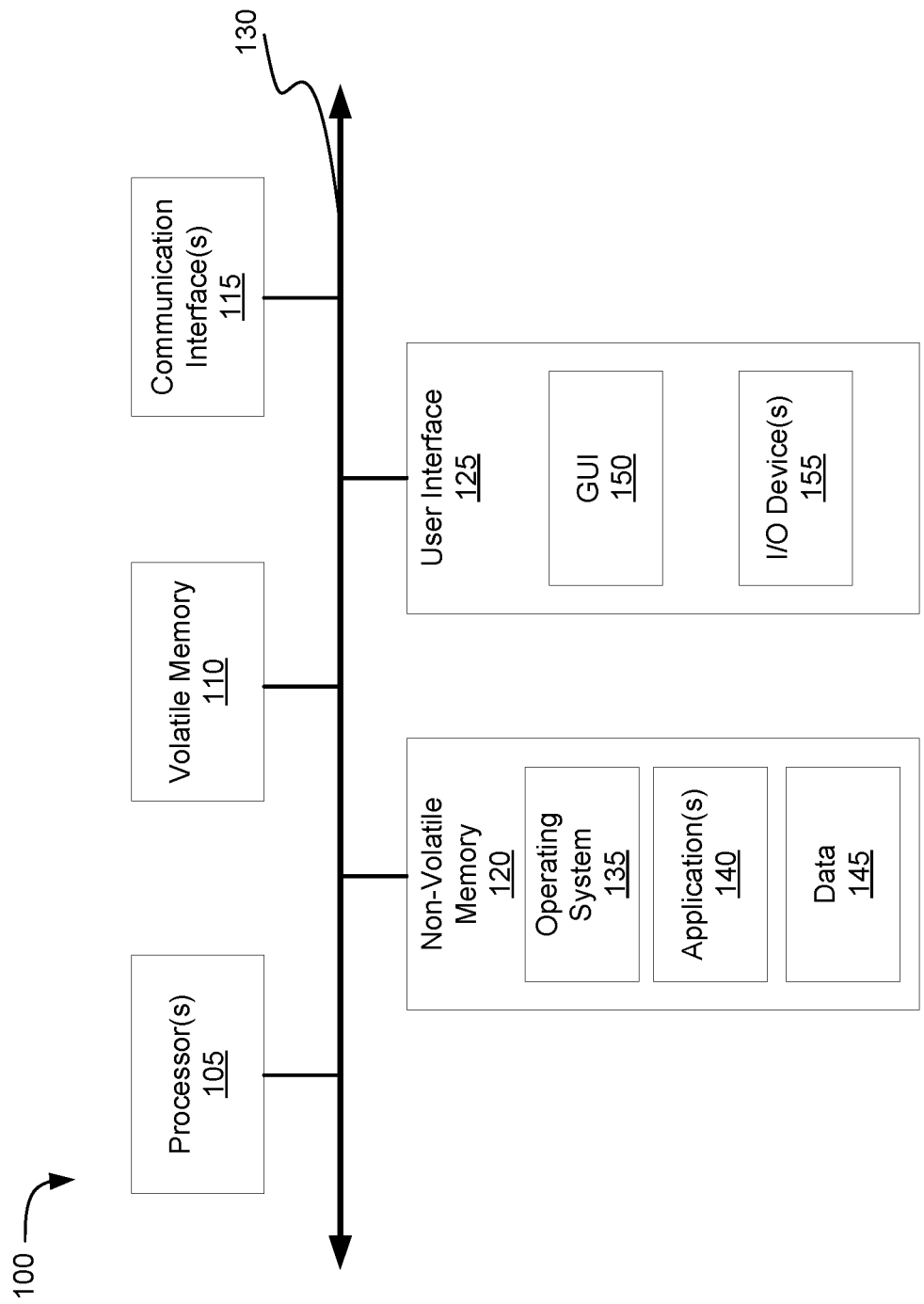

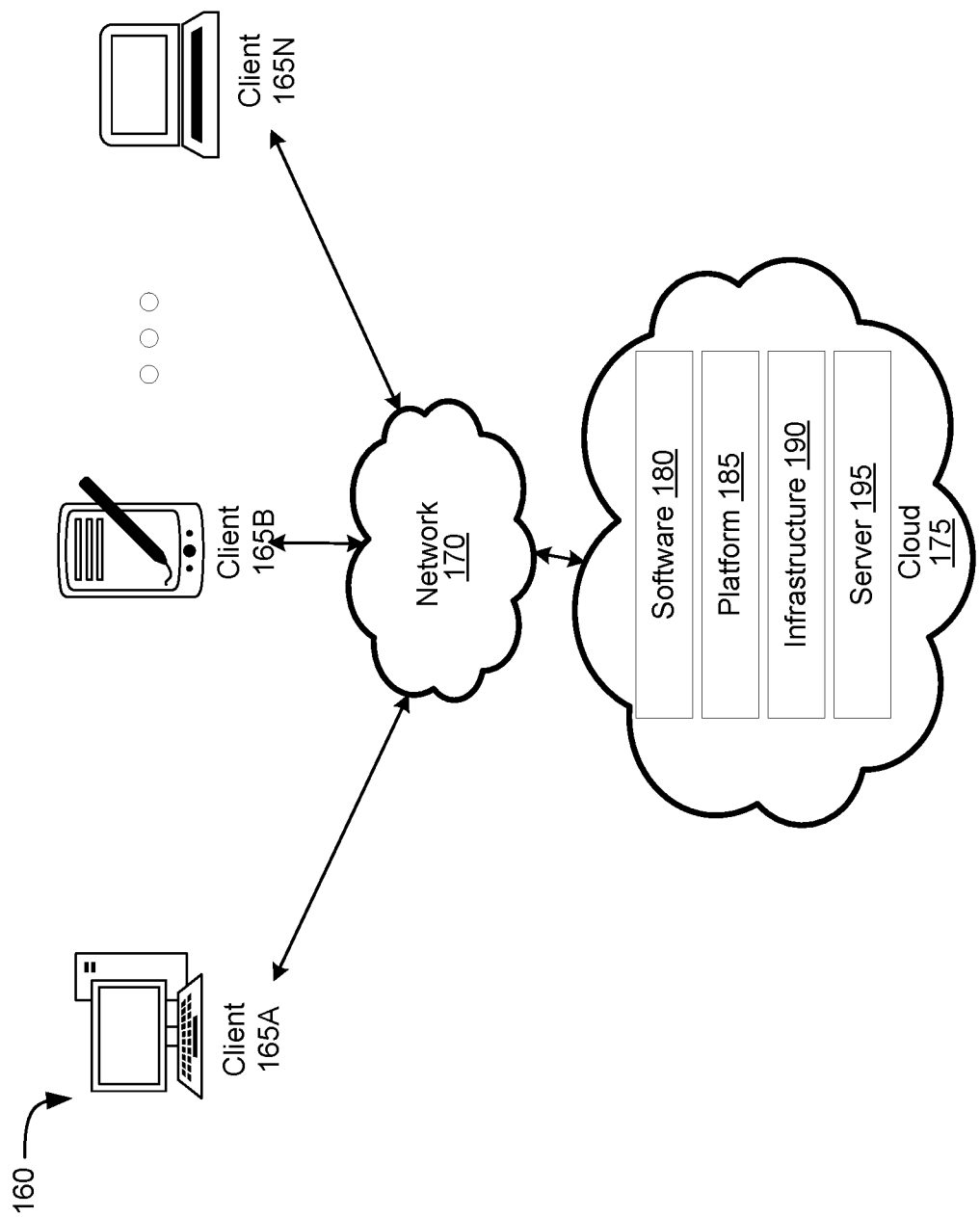

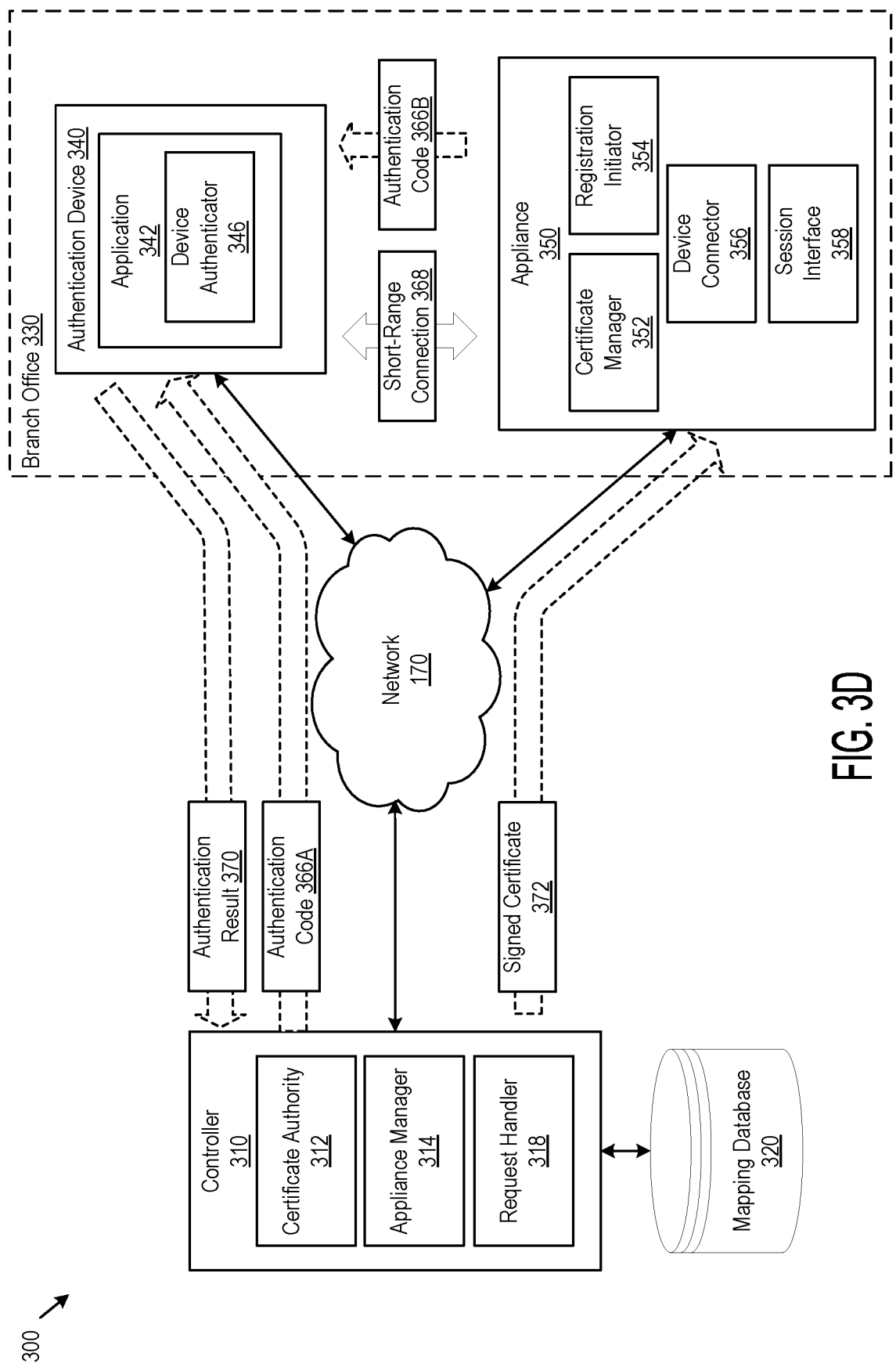

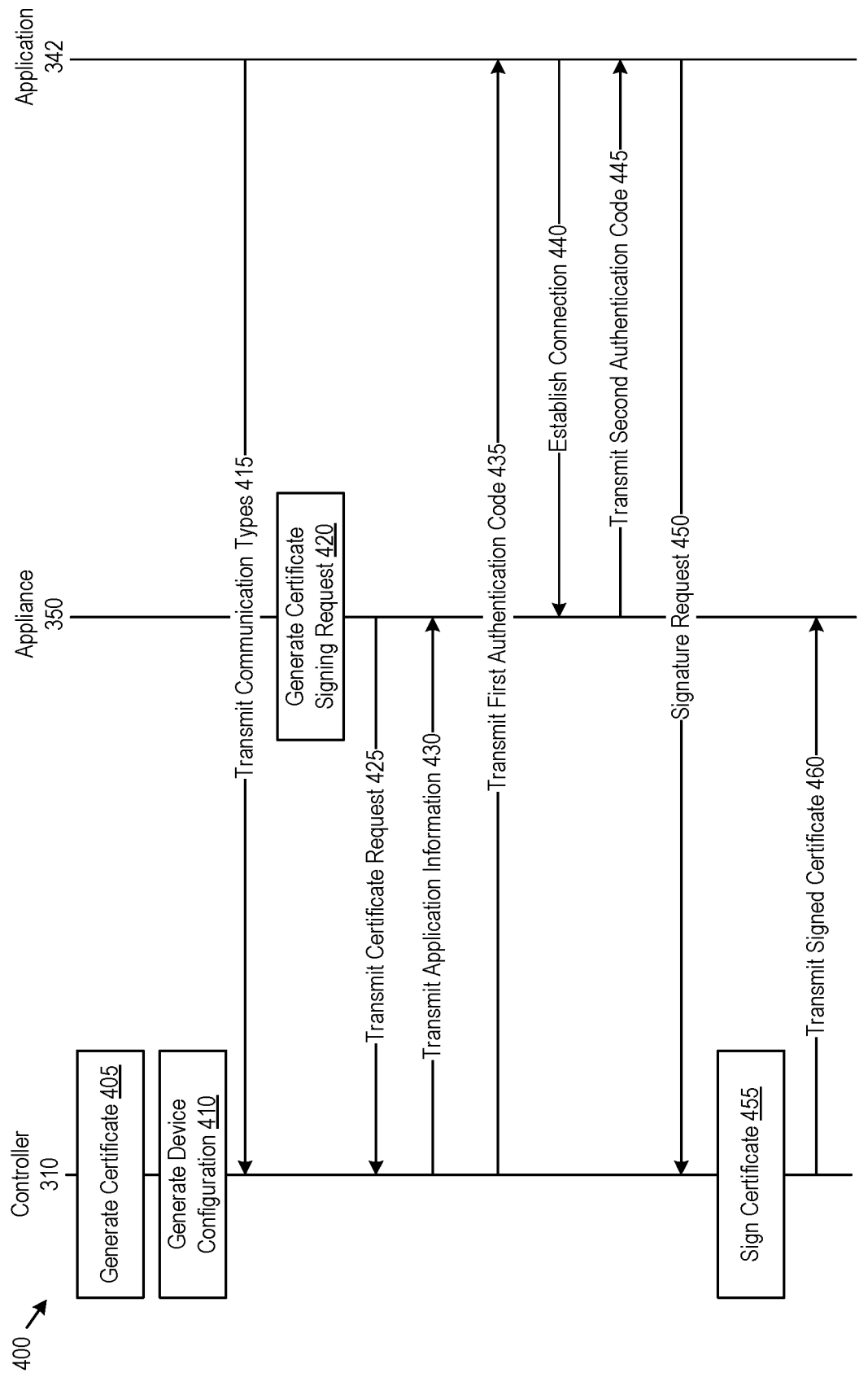

PROVISIONING DEVICES SECURELY USING ZERO TOUCH DEPLOYMENTS

FIELD OF THE DISCLOSURE

The present application generally relates to securely provisioning devices. In particular, the present application relates to systems and methods for provisioning devices securely using zero touch deployments.

BACKGROUND

For the purposes of authentication, a first device may provide authentication credentials in the form of an identifier and a passcode to a second device. When the authentication credentials provided by the first device match the authentication credentials maintained by the second device, the second device may grant access to a protected resource.

BRIEF SUMMARY

It may be challenging to zero touch provision an appliance (e.g., device, software-defined networking (SD-WAN) appliance, etc.) without compromising the user experience. For example, a network administrator may want to provision a SD-WAN Appliance with a zero touch deployment. However, provisioning may result in security vulnerabilities, while securing the provisioning may compromise the user experience. The network administrator can configure an activation key on the appliance, identify a network address (e.g., IP Address) of the appliance, or use an approval mechanism for provisioning the appliance. The appliance can establish a secure connection with the network administrator by using a public certificate authority (CA). For example, the CA can be the public CA for SD-WAN Appliances to validate the network administrator. The network administrator can authorize a serial number of the appliance based on an appliance identifier. However, authentication of the appliance based on its serial number can cause a security vulnerability because rogue appliances could spoof the serial number and establish a connection with the network administrator. To solve these problems, there may be few approaches.

One technique is for the central administrator to configure the network address on a cloud orchestrator to perform zero touch provisioning. This approach relies on the central administrator identifying the network address of the appliance. Therefore, this technique may rely on the appliance connecting to a public network, which can be unsecure.

If the central administrator connects to the appliance, then another technique for provisioning an appliance may be to have the central administrator view provisioning requests from the appliance and then contact a branch administrator to approve or deny the provisioning requests. However, the central administrator may have to view the provisioning request for the appliance before approving or denying the request by contacting the branch administrator. This approach can delay the provisioning process because the central administrator might not be available (e.g., different time zones).

Another approach for provisioning appliances is for the central administrator to share the activation key with the branch administrator. The branch administrator can either enter the activation key manually on the appliance or connect to appliance via a network (e.g., Wi-Fi, mobile, etc.) to configure the activation key for zero touch deployment. However, this approach involves participation by the branch administrator, which can cause delays and manual entry of authentication keys can worsen user experience.

Another approach for provisioning appliances is to embed TLS certificates during manufacturing of the appliance. The network administrators could then authenticate the appliance based on their TLS certificates. For example, this approach can include a manufacturer involving Secure Zero Touch Provisioning (SZTP) and Bootstrapping Remote Secure Key Infrastructures (BRSKI) to embed X. 509 certificates and their private keys into the secure storage of an appliance. The network administrators can use the certificates to authenticate the appliance and to perform the provisioning process if the authentication is successful. However, embedding the certificates can be difficult and the authentication will fail if there are any issues with the certificates. For example, embedding the TLS certificates into the appliance during manufacturing phase can increases the manufacturing cost and maintenance cost to preserve the CA.

Moreover, under this approach, physical vulnerabilities can arise. For example, the user can lose physical access to their appliance and unknowingly add a malicious to the network until the central administrator notices and blocks the appliance. Additionally, SZTP can result in appliances having a unique TLS client certificate and its private key in secure storage. The TLS client certificate can be used by provisioning servers to authenticate the appliance. Likewise, BRSKI (draft-ietf-anima-bootstrapping-keyinfra) can result in an appliance having a unique 802.1AR secure device identifier (IDevID) as a certificate. In both standards, the manufacturer can sign the certificate, and various deeply integrated mechanisms ultimately relying on Public Key Infrastructure (chains of signed certificates with several pre-configured trust roots) can be used to resolve trust problems arising in zero touch provisioning scenarios.

To account for these and other challenges, a controller application (e.g., orchestrator app) may be used as an authenticator between the appliance and a controller (e.g., cloud orchestrator). The controller can generate a Root CA and controller certificate. The controller can generate the Root CA, such as a public or private key, during initiation. The controller can generate Certificate Signing Request (CSR) private keys and the CSR can be signed by the Root CA (private key). The controller certificate can be the public certificate for the controller with respect to the connectivity of the appliance. The controller can also include configurations for the appliance, such as provisioning configurations. The controller can have a predetermined mapping of controller applications and appliances managed by the branch administrator. For example, more than one appliance can be mapped to a controller application.

The controller application can be available in an application distribution portal, and may be installed on an authentication device such as a mobile device, smart device, smart phone, smart watch, or any other device. The authentication device can communicate via short-range wireless technologies such as Wi-Fi, Wi-Fi Direct, Bluetooth, Bluetooth Low Energy (BLE), or Near Field Communication (NFC). The controller application can also register short-range wireless technology attributes such as device name and key-pair with the controller. The branch administrator can use the authentication device to scan a QR code shared by the central administrator to view statistics of the appliances and to receive event notifications. By scanning the QR code, the controller application can also securely connect with the controller.

The controller application can improve user experience while allowing for secure zero touch provisioning of appliances over a network. The controller application can be developed and reused to perform zero touch deployments for appliance. The controller application can support communications with the appliance via short-range wireless technology for improving user experience and ease of deployment of the appliance by the controller. By introducing the controller application to securely use short-range wireless technologies to enable provisioning of the appliance, the controller application can authenticate appliances or any other equipment for secure zero touch deployments by the controller. Additionally, the controller application can allow the controller to view information (e.g., statistics) or receive event notifications relating to the appliance.

When the branch administrator connects the appliance to the network, the appliance can generate a private key and a CSR. The appliance can also generate a one-time authenticator (OTA) such as a random number. The appliance can use the public CA to verify the controller. The appliance can transmit a registration request to the controller. The registration request can include an identifier of the appliance and the CSR. The controller can validate the appliance identifier of the appliance and then send the appliance the information about the controller application such as its supported short-range wireless technologies, appliance name, and key-pair. At any time before or after the appliance connects to the network, the controller can send the OTA to the controller application that is mapped to the appliance identifier of the appliance. The controller can also send information about the appliance to the controller application. After receiving the OTA, the controller application can establish short-range wireless technology communications with the appliance. After connecting to the controller application via the short-range wireless technology, the appliance can send the OTA to the controller application. The controller application can compare the OTA received by the controller and the appliance. If both OTAs match, then the controller application sends an auto approval request to the controller. Based on the approval request, the controller can sign the received CSR. The controller can transmit a registration response to the appliance. The registration response can include the signed CSR or the Root CA Public Certificate. The controller can also receive a network heartbeat of the appliance. The appliance can use the signed CSR for further communication with the controller, such as to establish secure communications for the controller to configure or provision the appliance.

The techniques described herein can thus enable provisioning of the appliance by the controller if a branch administrator (e.g., authenticated agent) is available near to the appliance. The controller application thus addresses physical security vulnerabilities (e.g., the appliance is stolen) because the controller application is near the appliance to enable provisioning. For example, the branch administrator using the controller application can be physically present near the appliance to use short-range wireless connectivity for zero-touch provisioning. The user can authenticate themselves with the controller (e.g., password, pin, authentication methods, etc.) to verify the identity and physical location of the appliance. However, the user does not need to have technical skills for provisioning the appliance beyond the basic ability to use a controller application, which installs on a mobile device. By relying on the controller application, the appliances also do not need to have a manufacturer-provisioned certificate, and deep integration between manufacturing and provisioning systems is no longer necessary.

The controller application can mitigate the threat of rogue users. If a rogue appliance spoofs the appliance identifier of an authorized appliance and sends the registration request to the controller, then the controller can reject the registration request by detecting a duplicate appliance. Even if a rogue appliance spoofs the appliance identifier of the appliance before it is connected and provisioned, then the rogue appliance will not be able to obtaining provisioning without also obtaining physical access to the controller application. However, relying on short-range communications such as NFC mitigates the risk of rogue users wirelessly hijacking the connection between the appliance and the authentication device. Moreover, the controller can also share the OTA with the controller application via short-range communications. After the controller application receives the OTA from the controller, it can match the OTA and approve the provisioning request. The appliance can also manage certificate expiration. Prior to the expiration of the certificate, the appliance can generate a new CSR and send it to the controller via a secure channel. The controller can sign the new CSR and transmit the signed certificate to the appliance.

In this manner, the controller can securely provision appliances with zero touch provisioning. This approach can enable deployment of appliances at scale while addressing security risks because such appliances form a critical part of enterprise networking and security infrastructure, all while providing a user-friendly, mostly automated deployment process that does not necessitate deep technical skills and avoids human error. The controller application does not entail complex technical expertise for performing automatic enrollment and provisioning, thereby improving security. The approach can thus enable zero touch deployment (ZTD), which is the enrollment and remote provisioning of new appliances on the network without relying on a technical expert on site. However, this approach can also be compatible with TPM cryptography hardware block on SD-WAN appliances to deliver a ZTD implementation that is both user-friendly and secure. Moreover, using the combination of physical proximity and agent login credentials can establish end-to-end authentication and trust between the appliance and the centralized management system.

At least one aspect of this disclosure is directed to systems, methods, and non-transitory computer-readable media for signing a certificate. A controller application can receive a first authentication code from the controller, responsive to the controller validating a device identified in a certificate signature request from the device. The controller application can establish, responsive to receiving the first authentication code, a short-range wireless connection with the device within a pairing range of the controller application using at least one of one or more short-range wireless communication types. The controller application can receive a second authentication code from the device via the short-range wireless connection. The controller application can determine that the first authentication code received from the controller corresponds to the second authentication code received via the short-range wireless connection. The controller application can transmit, responsive to determining that the first authentication code corresponds to the second authentication code, an approval request to the controller to sign a certificate to authorize the device to communicate with the controller.

In some embodiments, the controller application can receive a third authentication code from a second device via a second short-range wireless connection with the second device within the pairing range. In some embodiments, the controller application can determine that the third authentication code from the second device does not correspond to a fourth authentication code for the second device received from the controller. In some embodiments, the controller application can transmit, responsive to determining that the third authentication code does not correspond to the fourth authentication code, a denial request to the controller to restrict signing of a second certificate for the second device.

In some embodiments, the controller application can provide the one or more short-range wireless communication types to the controller for registration. The one or more short-range wireless communication types can identify (i) a device identifier corresponding to a second device executing the controller application and (ii) an encryption key to apply to the short-range wireless connection between the device and the second device. In some embodiments, receiving the first authentication code includes a second device receiving, concurrent to installation of the controller application on the second device, a plurality of authentication codes authorized for the approval request. In some embodiments, transmitting the approval request can include transmitting the approval request to the controller to sign the certificate for the certificate signature request. The certification authority on the controller can generate the certificate.

In some embodiments, the controller application can acquire a code identifying communication information for connecting with the controller. In some embodiments, the controller application can provide, to the controller via a communication session established in accordance with the communication information identified in the code, one or more short-range wireless communication types for the controller application.

At least one aspect of this disclosure is directed to systems, methods, and non-transitory computer-readable media for signing a certificate. A controller can receive, from a controller application, one or more short-range wireless communication types for the controller application. The controller can receive, from a device, a certificate signature request including a device identifier of the device and a first authentication code. The controller can transmit, to the device, responsive to validating the device identifier, the one or more short-range wireless communication types with which the device is to establish a short-range wireless connection with the controller application within a pairing range of the controller application. The controller can transmit, to the controller application, the first authentication code included in the certificate signature request. The controller can receive an approval request from the controller application responsive to determining that the first authentication code corresponds to a second authentication code received via the short-range wireless connection. The controller can sign, responsive to receiving the approval request, a certificate for the certificate signature request to authorize the device to communicate with the controller.

In some embodiments, the controller can receive a denial request from the controller application responsive to determining that a third authentication code received for a second device from the controller does not correspond to a fourth authentication code received via a second short-range wireless connection from the second device. In some embodiments, the controller can restrict, responsive to receiving the denial request, signing of a second certificate for a second certificate signature request for the second device.

In some embodiments, the controller can receive, from a second device, a second certificate signature request including the device identifier. In some embodiments, the controller can determine, that the device identifier included in the second certificate signature request corresponds to the device authorized to communicate with the controller. In some embodiments, the controller can restrict, responsive to determining that the device identifier included in the second certificate signature request corresponds to the device, signing of a second certificate for the second certificate signature request.

In some embodiments, the controller can receive, from the device, a second certificate signature request including the device identifier, responsive to determining that the certificate is to expire within a time period. In some embodiments, the controller can sign, responsive to determining that the device corresponding to the device identifier was previously authorized to communicate with the controller, a second certificate for the second certificate signature request.

In some embodiments, signing can include signing, responsive to receiving a notification message from the device, the certificate for the certificate signature request. In some embodiments, signing can include transmitting a response including the certificate signed to authorize the device to communicate with the controller.

In some embodiments, the controller can generate a certificate using a certification authority on the controller. In some embodiments, transmitting the first authentication code can include transmitting, to a second device, concurrent to installation of the controller application on the second device, a plurality of authentication codes authorized for the approval request. In some embodiments, the controller can identify a plurality of device identifiers corresponding to a plurality of devices to be approved via the one or more short-range wireless communication types for the controller application.

At least one aspect of this disclosure is directed to systems, methods, and non-transitory computer-readable media for signing a certificate. A device can have one or more processors coupled with memory. The device can transmit, to a controller, a certificate signature request including a device identifier of the device and a first authentication code. The device can receive, from the controller, one or more short-range wireless communication types for a controller application registered with the controller responsive to validation of the device identifier. The device can establish, in accordance with the one or more short-range wireless communication types, a short-range wireless connection with the controller application within a pairing range of the device. The device can transmit, to the controller application via the short-range wireless connection, a second authentication code. The device can receive, from the controller, a response including the certificate signed to authorize the device to communicate with the controller in response to receiving an approval request from the controller application indicating to the first authentication code corresponding to the second authentication code.

In some embodiments, the device can determine that an expiration time of the certificate is within a threshold time limit relative to an issuance time. In some embodiments, the device can transmit, to the controller responsive to determining that the expiration time is within the threshold time limit, a second certificate signature request. In some embodiments, the device can receive, from the controller, a second response including a second certificate signed by the controller to authorize the device to communicate with the controller.

In some embodiments, the device can receive, from the controller, a rejection message to indicate restriction of signing of a second certificate for the device responsive to the controller receiving a denial request from the controller application. The denial request can be transmitted by the controller application responsive to determining that a third authentication code received from the device from the controller does not correspond to a fourth authentication code received via a second short-range wireless connection with the controller application. In some embodiments, the device can receive, from the controller, a rejection message to indicate restriction of signing of a second certificate for the device, responsive to the controller determining that a second device identifier included in a second certificate signature request corresponds to a second device previously authorized to communicate with the controller. In some embodiments, the device can receive, from the controller, the response including the certificate signed to authorize the device to communicate with the controller responsive to the controller receiving a notification message.

In some embodiments, the device can generate, using a certificate authority on the device, (i) a private encryption key to encrypt communications with the controller and (ii) a second certificate to be included in the certificate signature request, the device initially configured to lack the private encryption key.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 1A is a block diagram of embodiments of a computing device;

FIG. 1B is a block diagram depicting a computing environment comprising a client device in communication with cloud service providers;

FIG. 3D is a block diagram of the system focusing on the controller and the authentication device provisioning the appliance in accordance with an illustrative embodiment;

FIG. 4 is a flow diagram of a flow for provisioning devices securely using zero touch deployments in accordance with an illustrative embodiment.

Figure 2A:
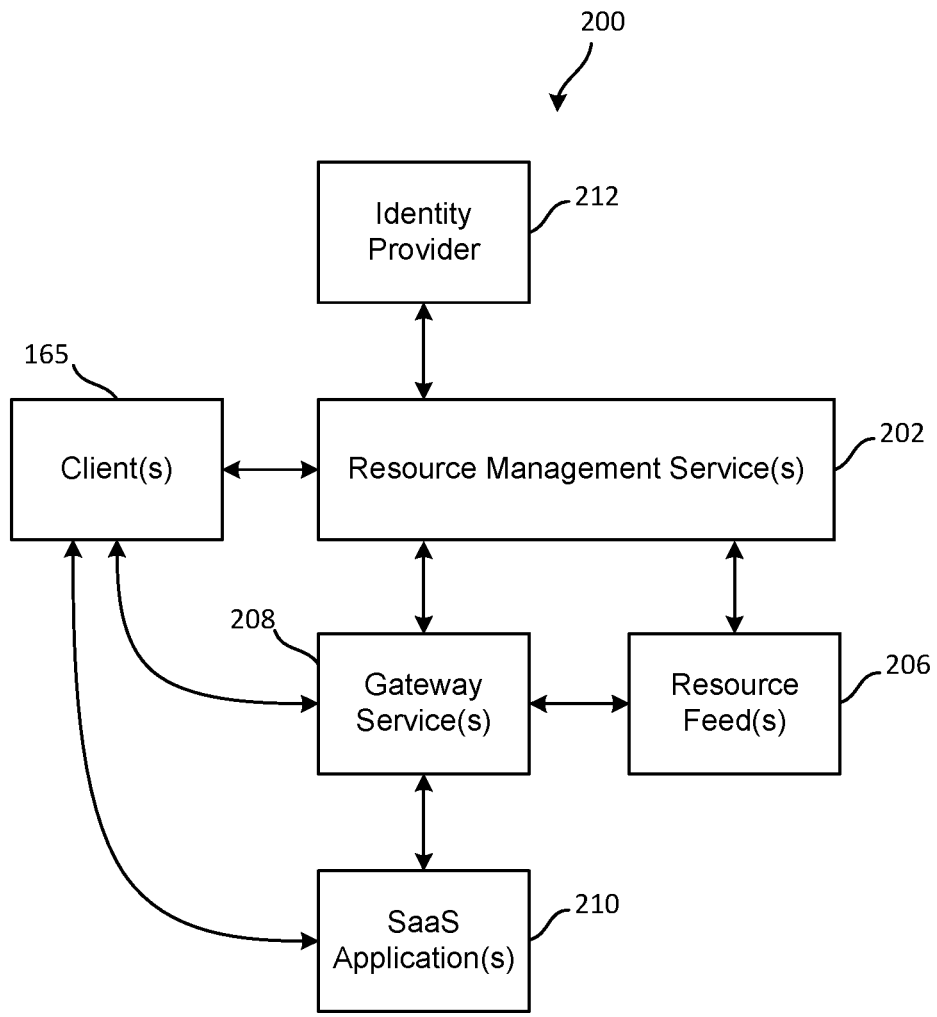
FIG. 2A is a block diagram of an example system in which resource management services may manage and streamline access by clients to resource feeds (via one or more gateway services) and/or software-as-a-service (SaaS) applications.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for provisioning devices securely using zero touch deployments.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), one or more communications interfaces 115, a user interface (UI) 125, and communication bus 130. The user interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, processor 105 out of volatile memory 110 executes computer instructions of operating system 135 and/or applications 140. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client-computing device. For example, the computing device 100 may execute a virtual machine, which provides an execution session within which applications execute on behalf of a user or a client-computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165A-165N in communication with a cloud 175 over one or more networks 170. Clients 165 may include, e.g., thick clients, thin clients, and zero clients. The cloud 108 may include back end platforms, e.g., servers, storage, server farms, or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 175 may include public servers that are maintained by third parties of the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include a server 195, e.g., back end platforms, storage, server farms, or data centers. For example, the cloud 175 can include or correspond to a server or system remote from one or more clients 165 to provide third-party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a Service (IaaS). The computing environment 160 can include Platform as a Service (PaaS). The computing environment 160 can include server-less computing. The computing environment 160 can include Software as a Service (SaaS). For example, the cloud 175 may also include a cloud-based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Wash.; RACKSPACE CLOUD provided by Rackspace US, Inc., of San Antonio, Tex.; Google Compute Engine provided by Google, Inc. of Mountain View, Calif.; or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash.; Google App Engine provided by Google, Inc.; and HEROKU provided by Heroku, Inc., of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google, Inc.; SALESFORCE provided by Salesforce.com, Inc. of San Francisco, Calif.; or OFFICE 365 provided by Microsoft Corporation. Examples of SaaS may also include data storage providers, e.g., DROPBOX provided by Dropbox, Inc. of San Francisco, Calif.; Microsoft SKYDRIVE provided by Microsoft Corporation; Google Drive provided by Google, Inc.; or Apple ICLOUD provided by Apple, Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more SaaS applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 202, one or more file repositories and/or file sharing systems, one or more secure browser services, one or more access control services for the SaaS applications 210, one or more management services for local applications on the client(s) 202, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
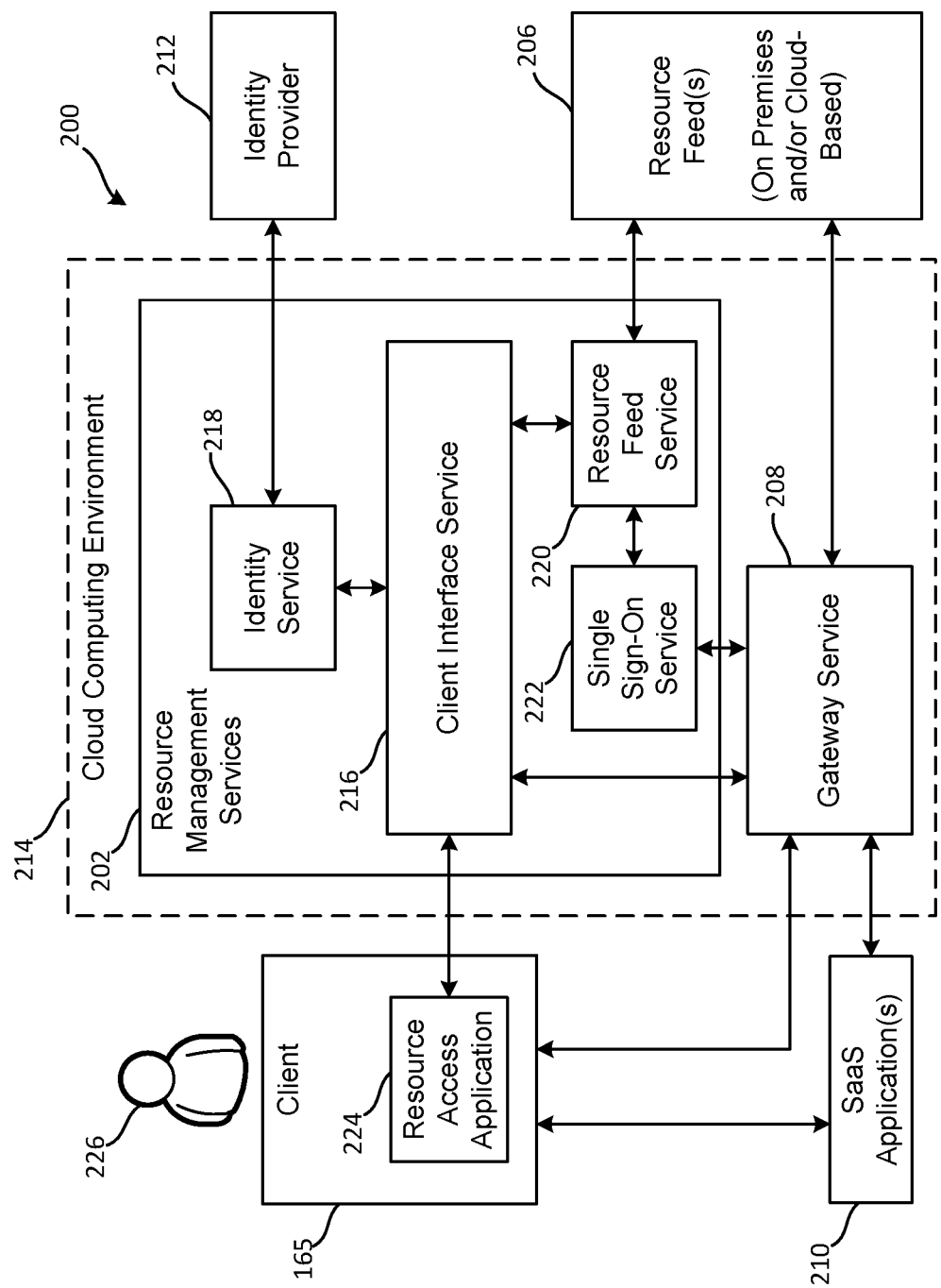
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud-computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, execute on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource access application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4)

restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
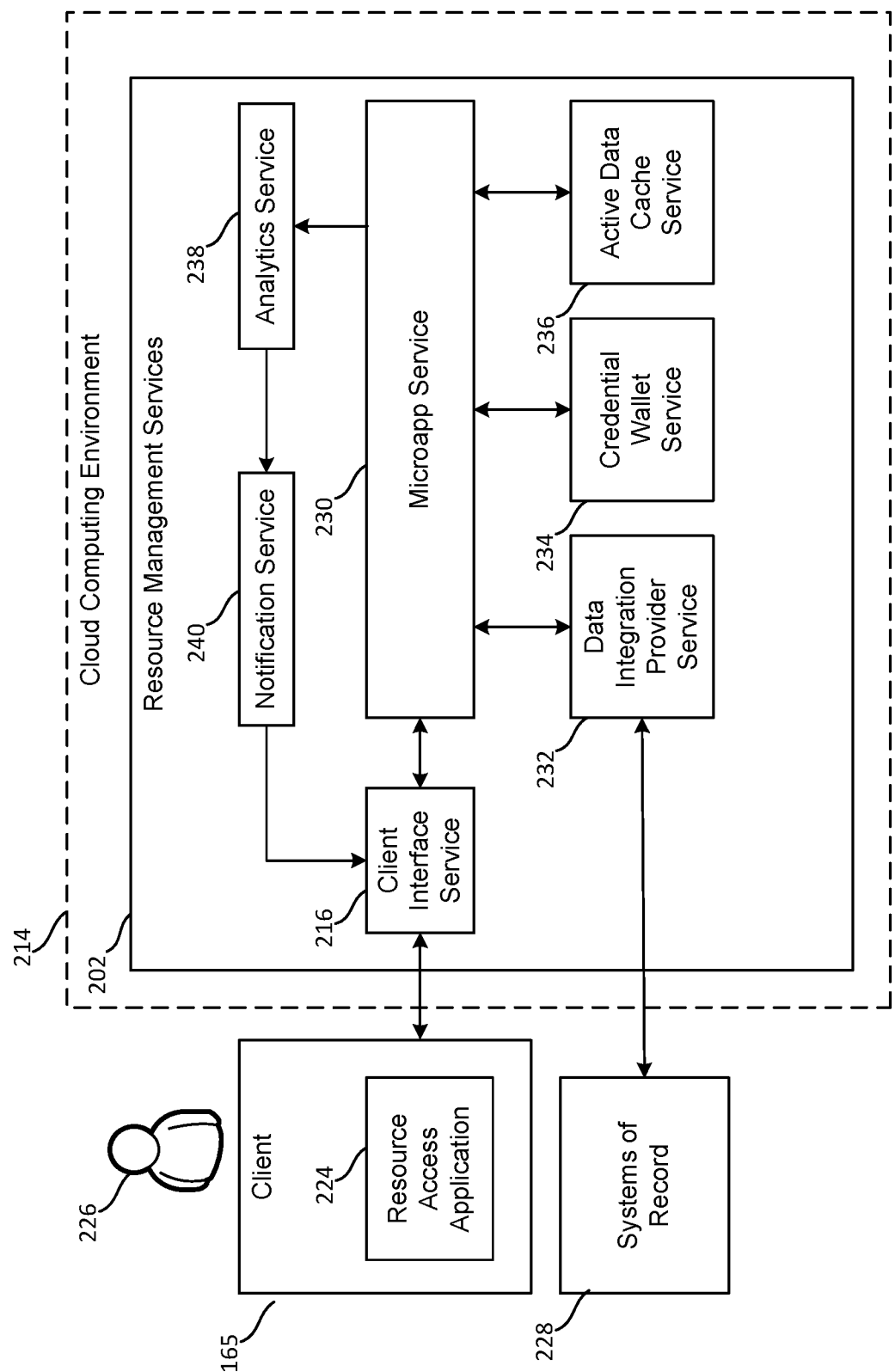
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted OAuth2 token for the system of record for which the action is to be invoked, and may send the action to the data integration provider service 232 together with the encrypted OAuth2 token. The data integration provider service 232 may then decrypt the OAuth2 token and write the action to the appropriate system of record under the identity of the user 226. The data integration provider service 232 may then read back changed data from the written-to system of record and send that changed data to the microapp service 230. The microapp service 230 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance functionality either through the resource access application 224 or directly from another resource, such as Microsoft Teams. This feature may allow employees to work efficiently, stay organized, and deliver only the specific information they are looking for.

Figure 3A:
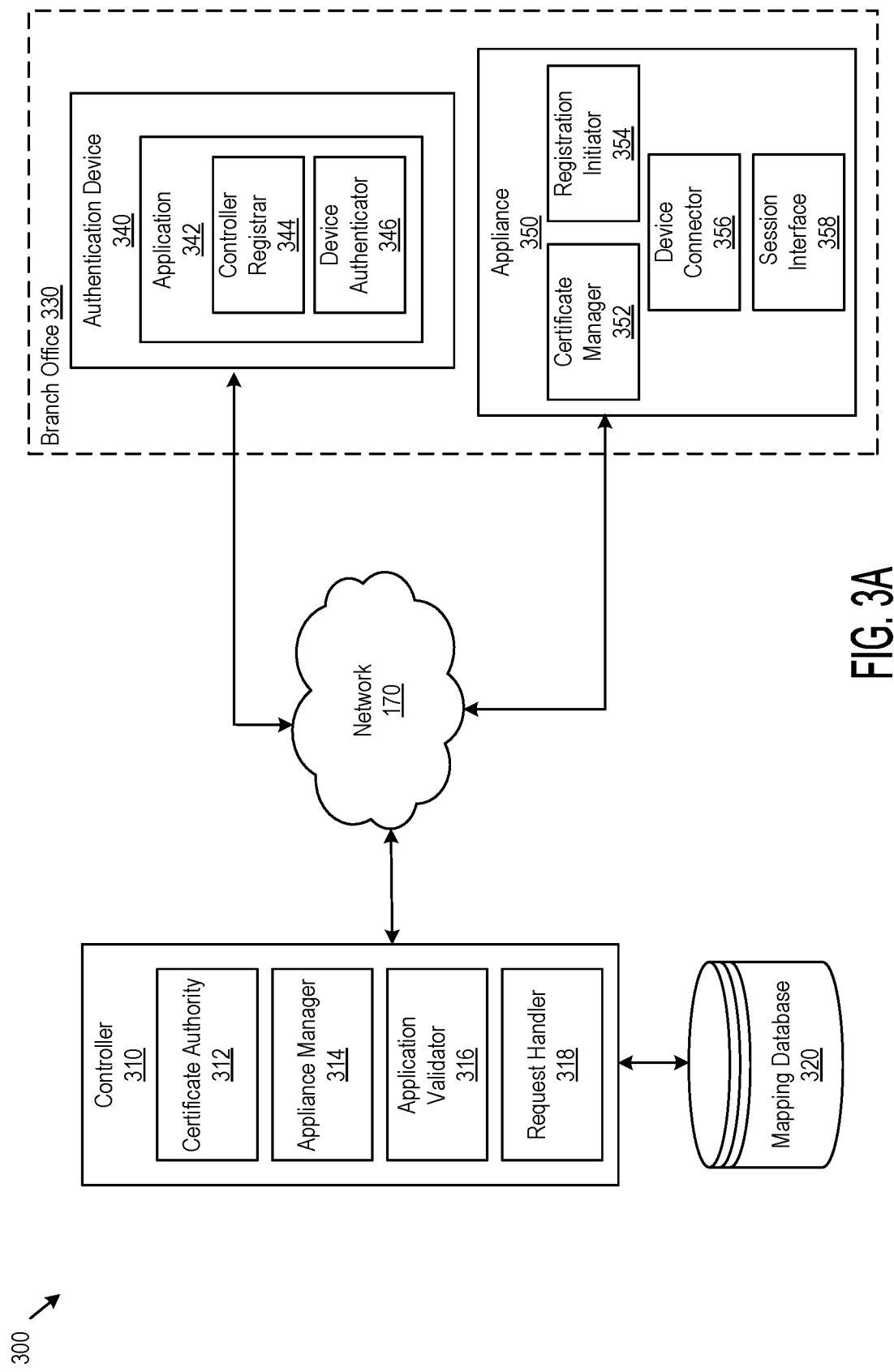
FIG. 3A is a block diagram of a system for provisioning an appliance securely using zero touch deployments in accordance with an illustrative embodiment.

C. Systems and Methods for Provisioning Devices Securely Using Zero Touch Deployments Referring now to FIG. 3A, depicted is a block diagram of a system 300 for provisioning devices securely using zero touch deployments. In brief overview, the system 300 can include a network 170, a controller 310, an authentication device 340, and an appliance 350. The controller 310 can communicatively couple to the authentication device 340 and the appliance 350 via the network 170. The authentication device 340 and the appliance 350 can be physically located at a branch office 330. The controller 310 can include a certificate authority 312, an appliance manager 314, an application validator 316, a request handler 318, and a mapping database 320. The authentication device 340 can include an application 342 (sometimes herein referred to as a controller application). The application 342 can include can include a controller registrar 344 and a device authenticator 346. The appliance 350 can include a certificate manager 352, a registration initiator 354, a device connector 356, and a session interface 358.

The controller 310, the authentication device 340, and the appliance 350 (including the certificate authority 312, the appliance manager 314, the application validator 316, the request handler 318, the mapping database 320, the application 342, the controller registrar 344, the device authenticator 346, the certificate manager 352, the registration initiator 354, the device connector 356, and the session interface 358) can be implemented using components described in connection with FIGS. 1A, 1B, and 2A-C. In some embodiments, the appliance 350 includes, correspond to, or be the resource feed 206 or a SaaS service 210, or any combination thereof, among others. In some embodiments, the controller 310 includes, correspond to, or be a resource management service 202, the gateway service 208, or the identity provider 212, or any combination thereof, among others. In some embodiments, the authentication device 340 includes, correspond to, or be correspond to the client 165.

Each of the above-mentioned elements or entities is implemented in hardware, or a combination of hardware and software, in one or more embodiments. Each component of the system 300 can be implemented using hardware or a combination of hardware or software detailed above in connection with FIGS. 1A, 1B, and 2A-2C. Each of these elements or entities can include any application, program, library, script, task, service, process or any type and form of executable instructions executing on hardware of the various components in system 300 (e.g., the application validator 316, the request handler 318, the appliance manager 314, the certificate authority 312, the mapping database 320, the application 342, the controller registrar 344, the device authenticator 346, the certificate manager 352, the registration initiator 354, the device connector 356, and the session interface 358). The hardware includes circuitry such as one or more processors in one or more embodiments.

The controller 310 can handle, manage, or otherwise control the secure authentication and provisioning of the appliance 350. The controller 310 can be a network administration device, a software package, a user interface, or a combination thereof. A network administrator can manage the controller 310. The controller 310 can be located in a data center, a computer room, or any other remote location. Although the controller 310 can be located in a physical location that is separate from the branch office 330, the controller 310 can communicate via the network 170 with devices and appliances located in the branch office 330. The controller 310 can communicate via the network 170 with the authentication device 340 and the appliance 350. The controller 310 can communicatively couple to the mapping database 320.

The mapping database 320 can store and manage data relating to the authentication device 340 and the appliance 350. The mapping database 320 can be any type and form of database or data storage to store mappings, certificates, device identifiers, application identifiers, appliance identifiers, authentication codes, or any other electronic record. The mapping database 320 can store mappings or associations between the application 342 and the appliance 350. The mapping database 320 can also store mappings and associations among the branch office 330, the application 342, the appliance 350, and the branch office 330. For example, each application 342 can map to the appliance 350. In another example, a plurality of appliances can map to an application 342 such that a single branch administrator can use that application 342 to activate provisioning for multiple appliances. In another example, appliances can map to multiple applications such that multiple trusted users with their respective application can activate provisioning of the appliance 350.

The branch office 330 can be a location for storing and using the appliance 350. The branch office 330 can be a data center, a computer room, or any other location for storing networking components. A trusted branch administrator with the authentication device 340 can have physical access to the appliance 350. The branch office 330 can allow short-range communications between the authentication device 340 and the appliance 350.

The authentication device 340 can be a device that assists with the provisioning of the appliance 350. A branch administrator can own or operate the authentication device 340. The authentication device 340 can be a mobile device, smart device, smart phone, smart watch, or any other device that can communicate via short-range wireless technologies such as Wi-Fi, Wi-Fi Direct, Bluetooth, BLE, or NFC. The authentication device 340 can execute or include an application 342.

The authentication device 340 can install or execute the application 342. The branch administrator can receive or download the application 342 from an application portal such as a play store, or the controller 310. The application 342 can manage network communications with the controller 310 and short-range wireless communication with the appliance 350. The application 342 can include a user interface to allow the branch administrator to use the application 342 to enable or activate provisioning of the appliance 350.

The appliance 350 can include one or more devices to control access to a server on behalf of other devices at the branch office 330. The appliance 350 is sometimes herein referred to as a device, middle box, or intermediary appliance. In some embodiments, the appliance 350 is a software-defined networking (SD-WAN) appliance, a computer, device, networking equipment, or service. The appliance 350 can include software or firmware designed to provide a specific computing resource or service. The appliance 350 can have a network address (e.g., IP Address), an appliance identifier (e.g., serial number), or a security certificate. The appliance 350 can communicate with the controller 310 via the network 170. The appliance 350 can communicate with the authentication device 340 via short-range wireless technologies such as Wi-Fi, Wi-Fi Direct, Bluetooth, BLE, or NFC. The appliance 350 can be pre-configured prior to delivery to a user or the branch office 330. However, the appliance 350 can receive additional provisioning or need activation to operate at the branch office 330.

The certificate authority 312 of the controller 310 can generate a certificate. The certificate can include a Root CA and controller certificate, among others. The Root CA can include a Public CA to verify an identity of the controller 310 for the appliance 350 to communicate with the controller 310. The certificate authority 312 can generate the Root CA, such as a public or private encryption key, during initiation of the controller 310. The controller 310 can generate the encryption keys for a CSR. The controller 310 can use the CSR private keys to sign the generated certificate responsive to receiving a CSR from the appliance 350. For example, the signed certificate can include information about the public encryption key, information about the identity of the controller 310, and the digital signature of the controller 310 that has verified the certificate's contents. The signed certificate can be the public certificate for the controller 310 with respect to the connectivity of the appliance 350. For example, the controller 310 can transmit the signed certificate to the appliance 350. The appliance 350 can receive and examine the signed certificate. If the appliance determines that the certificate has a valid signature, then the appliance 350 examining the certificate can identify the controller 310, trust the controller 310, and then can use the private key to communicate securely with the controller 310.

The appliance manager 314 of the controller 310 can also include configurations for the appliance 350, such as provisioning configurations, software updates, settings, and permissions. Additionally, the appliance manager 314 can use the application 342 to view information (e.g., statistics) or receive event notifications (e.g., network disconnect) relating to the appliance 350. For example, the controller 310 can connect to the application 342, and if the application 342 connects to the appliance 350, then the controller 310 can connect to the appliance 350 via the application 342. The appliance manager 314 can use the application 342 to receive network statistics of the appliance 350, view the appliance 350 (e.g., via a camera of the authentication device 340 executing the application 342), or identify a location of the appliance 350 (e.g., estimate location based on a location of the authentication device 340 executing the application 342). The appliance manager 314 can also query the mapping database 320 to identify a mapping between the application 342 and the appliance 350. Based on the mapping, the appliance manager 314 can associate information or other data received from the application 342 with the appliance 350.

Figure 3B:
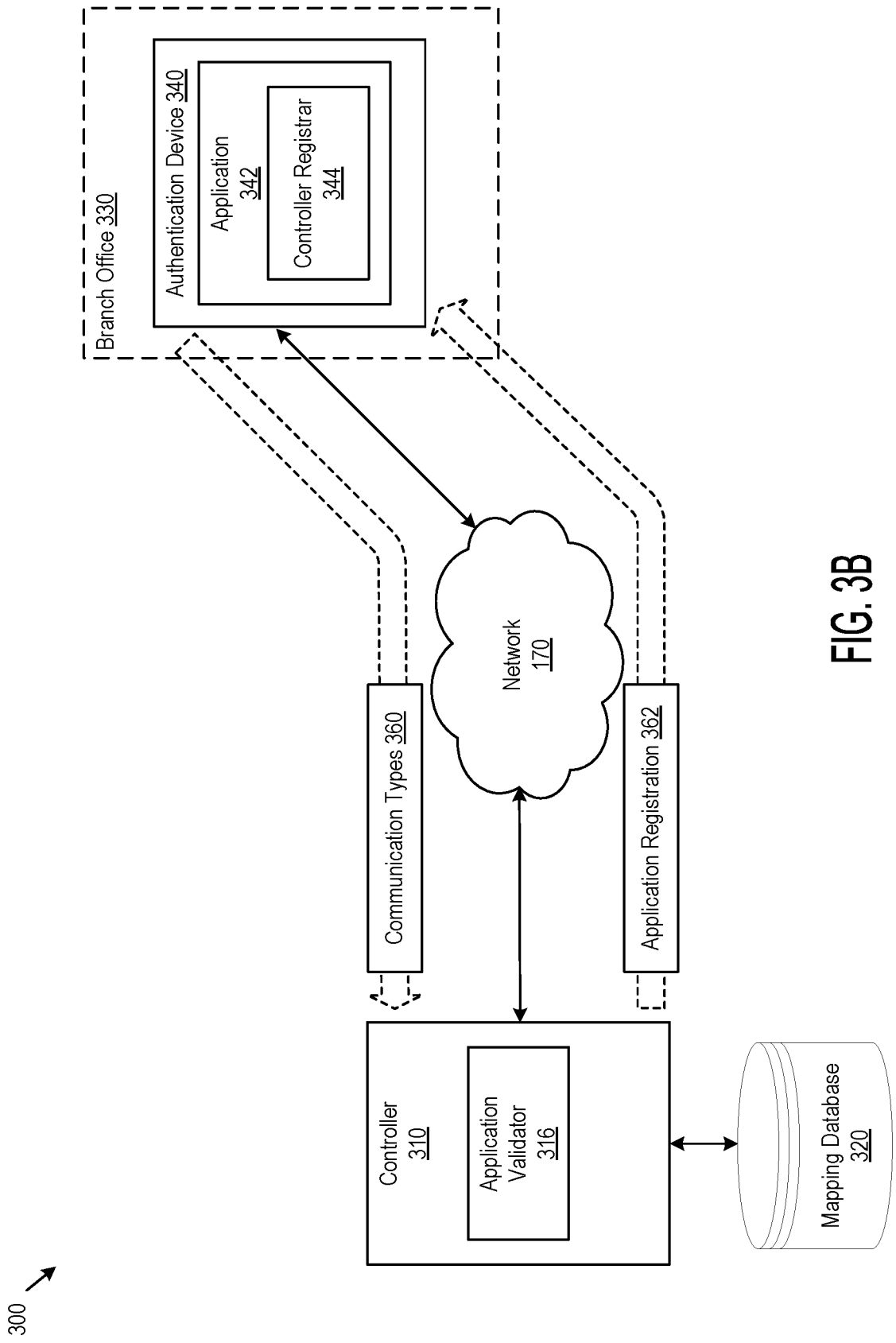
FIG. 3B is a block diagram of the system focusing on initializing the controller and the authentication device in accordance with an illustrative embodiment.

Referring now to FIG. 3B, depicted is a block diagram of the system 300 focusing on initializing the controller 310 and the authentication device 340. The authentication device 340 and the controller 310 can establish or maintain a communication session. The authentication device 340 can retrieve, receive, or otherwise acquire a code for establishing a communication session with the controller 310. The code can be a QR code, a security key, or any other encrypted data for establishing a communication session between the authentication device 340 and the controller 310 over the network 170. For example, the authentication device 340 can scan a QR code disposed on the appliance 350, or a branch administrator of the branch office 330 can enter a security key delivered with the appliance 350. Using the code, the authentication device 340 can identify the controller 310 associated with the appliance 350. To set up the communication session, the authentication device 340 can identify controller information from the code or from a data structure of the application 342. The controller information can include a network address of the controller 310, a version of the controller 310, or a network port for connecting with the controller 310. The authentication device 340 can use the controller information to configure the communication session with the controller 310. The authentication device 340 can use the communication session to download or install the application 342 from the controller 310. The authentication device 340 can also receive the application 342 from an application portal such as a play store or application store. Once downloaded, the authentication device 340 can install the application 342. The user (e.g., branch administrator) of the authentication device 340 can then initiate and execute the application 342 on the authentication device 340.

Upon execution, the controller registrar 344 of the application 342 can transmit communication types 360 to the controller 310 to register the application 342 with the controller 310. By transmitting the communication types 360 to the controller 310, the controller registrar 344 can also register short-range wireless technology attributes such as a name of the authentication device 340 or a key-pair. In some embodiments, the controller registrar 344 can also generate or otherwise identify application information such as a unique identifier of the application 342 or the authentication device 340, a security certificate, or communication types 360, among others.

The communication types 360 can include short-range wireless technologies. In some embodiments, the communication types 360 are one or more short-range wireless communication types. The short-range wireless technologies can include Wi-Fi, Wi-Fi Direct, Bluetooth, BLE, or NFC. The communication types 360 can be short-range wireless technologies supported by the authentication device 340 and the application 342 for communicating with the appliance 350. For example, the controller registrar 344 can determine that the authentication device 340 has a transceiver capable of communicating with another device (e.g., the appliance 350) via NFC, and that the application 342 is a version capable of managing NFC communications with the device. In some embodiments, the communication types 360 can identify an encryption key to apply to a short-range wireless connection with the authentication device 340. The encryption key can be a random string of bits generated by the controller registrar 344 to scramble and unscramble data exchanged between the authentication device 340 and the appliance 350. Based on the previous example, the controller registrar 344 could include NFC as a supported communication protocol in the communication types 360. The controller registrar 344 can also include the encryption key to encrypt data exchanged over NFC. In some embodiments, the communication types 360 identify a device identifier corresponding to the authentication device 340 executing the application 342. For example, the controller registrar 344 can include a serial number, name, or media access control (MAC) address of the authentication device 340 in the communication types 360.

Once identified, the controller registrar 344 can transmit the communication types 360 to the controller 310 to register the application 342 with the controller 310. In some embodiments, the controller registrar 344 can provide the communication types 360 and the device identifier to the application validator 316 for registration. The controller registrar 344 can also transmit the application information of the application 342 to the application validator 316. The controller registrar 344 can transmit the communication types 360 or the application information as part of a registration request to register the application 342 with the controller 310. In some embodiments, the application 342 can provide, to the application validator 316 via the communication session established in accordance with the communication information identified in the code, the communication types 360 for the application 342.

The application validator 316 of the controller 310 can in turn retrieve, identify, or receive the application information along with the communication types 360 from the authentication device 340. In some embodiments, application validator 316 can receive communications from the application 342 using the communication session established over the network 170 using the code. The communications can include the application information such as the communication types 360. In some embodiments, upon receipt, the application validator 316 can store and maintain the communication types 360.

Based on the application information, the application validator 316 can verify whether the application 342 has permission to register with the controller 310. In some embodiments, the application validator 316 can identify a unique identifier of the application 342 (or the authentication device 340) from the application information provided by the application 342. The application validator 316 can query the unique identifier in the mapping database 320 to determine whether the application 342 has permission to register with the controller 310. In some embodiments, the mapping database 320 can include a data structure that indicates whether the application 342 can register with the controller 310 or is restricted from registering with the controller 310. The data structure on the mapping database 320 can indicate that the application 342 can be associated with an authorized authentication device 340 and thus authorized to register. On the other hand, the data structure can also indicate that the application 342 can be associated with a deactivated authentication device and thus restricted from registering. The lack of any data structure associated with the application 342 (or by extension the authentication device 340) on the mapping database 320 may also indicate that the application 342 is not to be registered.

When the application validator 316 determines that the identifier is not present on the mapping database 320 or is associated with a deactivated device, the application validator 316 can determine that the application 342 does not have permission to register. If the application validator 316 determines that the application 342 does not have permission to register with the controller 310, then the application validator 316 can restrict, lock, or disable the application 342 from communicating with the appliance 350. In some embodiments, the application validator 316 can send or transmit an indicator that the registration for the application 342 has failed. Conversely, when the application validator 316 determines that the identifier is present on the mapping database 320 or is associated with an activated device, the application validator 316 can determine that the application 342 has permission to register. If the application 342 has permission to register with the controller 310, then the application validator 316 can validate the registration request of the application. The application validator 316 can further register the application 342 with the controller 310. By registering the application 342, the application validator 316 can enable the application 342 to communicate with the appliance 350.

Once the application 342 is registered, the application validator 316 can obtain, determine, or identify the appliance 350 with which the application 342 can communicate. The mapping database 320 can store associations between applications and appliances. For example, the branch administrator of the branch office 330 can install the application 342. The mapping database 320 can associate the appliances 350 of the branch office 330 with the application 342. Therefore, the mapping database 320 can associate the branch administrator of the branch office 330 with the appliances 350 at the branch office 330. In some embodiments, the application validator 316 can access the mapping database 320 to obtain a mapping of the application 342 with the appliance 350. For example, each application 342 or appliance 350 can have a unique identifier, such as a hash, code, or serial number. In some embodiments, the application validator 316 can identify a plurality of appliance identifiers corresponding to a plurality of appliances (e.g., the appliance 350) approved for the application 342. The approval may be for establishment of short-range wireless communication between each appliance and the authentication device 320. For example, the application validator 316 can determine that the application 342 can pair with the appliance 350 of a plurality of appliances. In some embodiments, the application validator 316 can use an application registration 362 to confirm registration of the application 342 and identification of the appliance 350 with which the application 342 can communicate.

In addition, the application validator 316 can generate an application registration 362 for the application 342. The application registration 362 can indicate that the application 342 registered with the controller 310. The application registration 362 can specify, identify, or otherwise include the communication types 360 registered by the controller 310 for the application 342. The application registration 362 can also specify a particular appliance or a plurality of appliances with which the application 342 has permission to communicate. The application registration 362 can include the appliance identifiers of the appliances with which the application 342 can communicate. The application registration 362 can also include short-range wireless technologies supported by each appliance associated with the appliance identifiers. For example, the application registration 362 can specify that the application 342 registered with the controller 310 and can now communicate with the appliance 350 via NFC or Bluetooth technologies. The application validator 316 can transmit or send, via the network 170, the application registration 362 to the application 342.

The controller registrar 344 can retrieve, identify, or otherwise receive the application registration 362 from the application validator 316 via the network 170. The controller registrar 344 can determine, based on the receipt of the application registration 362, that the application 342 has registered with the controller 310. The controller registrar 344 can parse the application registration 362, to identify the appliance 350 or a plurality of appliances that the application 342 has registered to communicate with the appliance 350. The controller registrar 344 can also identify, from the application registration 362, the short-range wireless technologies that the application 342 can use to communicate with the appliance 350. In some embodiments, upon receipt, the controller registrar 344 can store and maintain the application registration 362. The controller registrar 344 can store and maintain the application registration 362 in a data structure in memory of the authentication device 340.

Figure 3C:
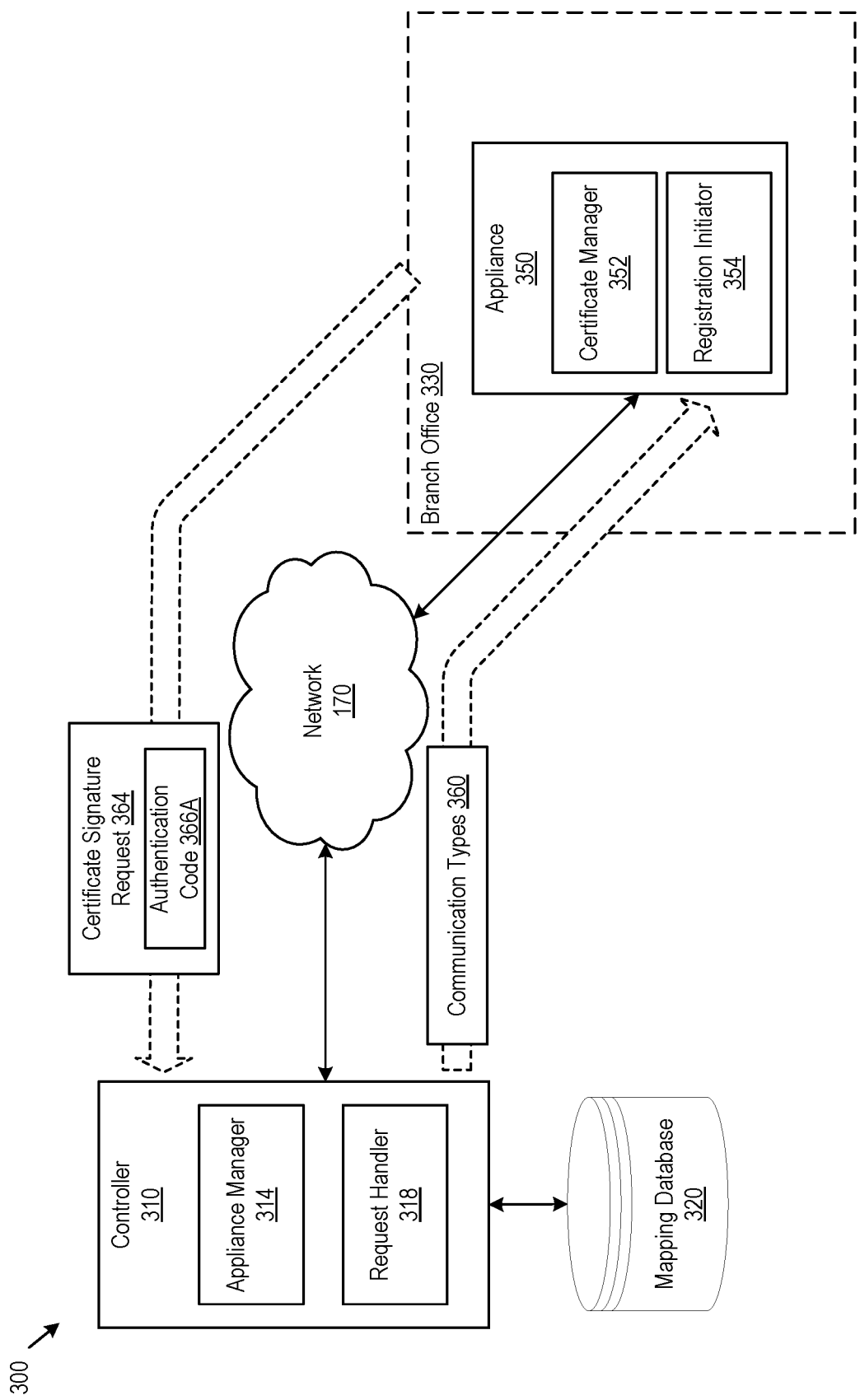
FIG. 3C is a block diagram of the system focusing on initializing the controller and the appliance in accordance with an illustrative embodiment.

Referring now to FIG. 3C, depicted is a block diagram of the system 300 focusing on initializing the controller 310 and the appliance 350. The certificate manager 352 of the appliance 350 can manage certificates for establishing communications with the controller 310. In some embodiments, the certificate manager 352 can generate a public or private key during initiation of the appliance 350. The certificate manager 352 can use the keys to encrypt communications with the controller 310. For example, the generated certificate or the keys can encrypt information about the appliance 350, such as the appliance identifier or provisioning information. In some embodiments, the certificate manager 352 can also generate an appliance certificate to secure communications with the controller 310.

The registration initiator 354 of the appliance 350 can generate a certificate signature request (CSR) 364 to transmit to the controller 310 to provision the appliance 350. In some embodiments, the appliance 350 initially lacks any encryption keys. The registration initiator 354 can use the certificate manager 352 to generate an encryption key (e.g., a private key and a public key in accordance with asymmetric cryptography). The encryption key can encrypt communications between the appliance 350 and the controller 310. For example, the registration initiator 354 can format the CSR 364 in accordance with a Signed Public Key, a Signed Public Key and Challenge, or a Public key Cryptography Standards, among others. In some embodiments, in generating the CSR 364, the registration initiator 354 can invoke or otherwise use the certificate manager 352 to generate the appliance certificate to verify the appliance 350. In some embodiments, the registration initiator 354 can transmit the CSR 364 with the appliance certificate.

The registration initiator 354 can include an authentication code 366A in the CSR 364. The registration initiator 354 can generate the authentication code 366A. The authentication code 366A can be an OTA), a numeric code, a hashed key, a token, or any other code. The application 342 can receive the authentication code 366A from the controller and compare it to other authentication codes to authenticate the appliance 350. The authentication code 366A can be valid for a one-time authentication of the appliance 350 for provisioning.

In some embodiments, the registration initiator 354 can include an appliance identifier of the appliance 350 into the CSR 364. The registration initiator 354 can identify the appliance identifier. The appliance identifier can be a serial number, media access control address (MAC address), or any other identifier to uniquely identify the appliance 350. The registration initiator 354 can determine the appliance identifier from the appliance 350, or retrieve the appliance identifier from a data structure on the appliance 350. The registration initiator 354 can transmit the appliance identifier of the appliance 350 to the controller 310. The registration initiator 354 can include the appliance identifier with the CSR 364 transmitted to the controller 310. The CSR 364 can include information about the appliance 350 and the provisioning requested. For example, the CSR 364 can include information relating to network availability of the appliance 350 or a software version requested by the appliance 350. In some embodiments, the registration initiator 354 can transmit the CSR 364 to the controller 310.

The registration initiator 354 can generate the CSR 364 with the authentication code 366A and the appliance identifier. The CSR 364 can be a request that the controller 310 sign the certificate for the CSR 364. The appliance 350 can use the signed certificate to authorize provisioning by the controller 310. With the generation, the registration initiator 354 can send, provide, or otherwise transmit the CSR 364 to the controller 310. In some embodiments, the certificate manager 352 can include, in the CSR 364, the public key with which the certificate can issue identifying information of the appliance 350, and integrity protection such as a digital signature. In some embodiments, the registration initiator 354 can generate the CSR 364 and the authentication code 366A when a branch administrator at the branch office 330 connects the appliance 350 to the network 170.

The request handler 318 of the controller can receive or identify the CSR 364 transmitted by the appliance 350. The request handler 318 can also parse the CSR 364 to identify the authentication code 366A. The request handler 318 can parse the CSR 364 to identify the appliance identifier of the appliance 350. In some embodiments, the request handler 318 can parse the CSR 364 to identify the appliance certificate as generated by the certificate manager 352 of the appliance 350. The request handler 318 can use the certificate authority 312 to decrypt or parse the appliance to identify the appliance 350.

Upon parsing the appliance, the appliance manager 314 can determine whether the appliance identifier corresponds to the appliance 350 that has permission to register with the controller 310. The appliance manager 314 may access the mapping database 320 to determine whether to validate the appliance 350 corresponding to the appliance identifier. In some embodiments, the mapping database 320 can include a data structure that indicates whether the controller 310 can provision the appliance 350 or is restricted from provisioning the appliance 350. The data structure on the mapping database 320 can indicate that the controller 310 can provision the controller 310 and thus process the CSR 364. For example, if the appliance manager 314 determines that the appliance identifier is unique and valid, then the appliance manager 314 can validate the appliance identifier corresponding to the appliance 350. For example, the appliance manager 314 can determine from the mapping database 320 that the appliance identifier corresponds to a new appliance that is scheduled for provisioning. On the other hand, the data structure can also indicate that the appliance 350 is associated with a deactivated appliance and thus restricted from provisioning by the controller 310. In some embodiments, the appliance manager 314 can determine whether the appliance identifier included in the CSR 364 corresponds to another appliance already authorized for provisioning by the controller 310. For example, the appliance manager 314 can query or search the appliance identifier in the mapping database 320. If the appliance manager 314 identifies that the appliance identifier in the mapping database 320 corresponds to another appliance already authorized for provisioning by the controller 310, then the appliance manager 314 may not validate the appliance identifier. The appliance manager 314 can also determine that the appliance identifier is a duplicate. In some embodiments, the appliance manager 314 can terminate communications with the appliance 350 if it is associated with a duplicate appliance identifier. For example, the appliance manager 314 can prevent a transmission of communication types 360 to an appliance associated with a duplicate appliance identifier.

The lack of any data structure associated with the appliance 350 on the mapping database 320 may also indicate that the controller 310 cannot provision the appliance 350. When the appliance manager 314 determines that the appliance identifier is not present on the mapping database 320 or is associated with a deactivated appliance, the appliance manager 314 can determine that the controller 310 does not have permission to provision the appliance 350. If the appliance manager 314 determines that the controller 310 does not have permission to provision the appliance 350, then the appliance manager 314 can restrict, lock, or disable the controller 310 from communicating with the appliance 350. In some embodiments, the appliance manager 314 can send or transmit an indicator that the CSR 364 has failed. Conversely, when the appliance manager 314 determines that the appliance identifier is present on the mapping database 320 or is associated with an activated device, the application validator 316 can determine that the controller 310 can provision the appliance 350. If the controller 310 can provision the appliance 350, then the appliance manager 314 can validate the CSR 364 of the application. The appliance manager 314 can further register the appliance 350 with the controller 310. By registering the appliance 350, the appliance manager 314 can enable the controller 310 to consider the CSR 364 from the appliance 350.

When the appliance manager 314 validates the appliance identifier, the appliance manager 314 can send, provide, or otherwise transmit the communication types 360 to the appliance 350. The communication types 360 can also include short-range wireless technologies supported by the authentication device 340, the device identifier of the authentication device 340, or the encryption key to encrypt the short-range wireless connection with the authentication device 340. The encryption key can be the public key for secure communications between the authentication device 340 and the appliance 350. In some embodiments, upon validating the appliance identifier of the appliance 350, the appliance manager 314 can select one or more of the communication types 360. The selected one or more communication types 360 can be communication types 360 that are supported by both the authentication device 340 and the appliance 350. For example, if the authentication device 340 supports NFC and Bluetooth while the appliance 350 supports NFC, then the appliance manager 314 can select NFC as the selected one or more communication types 360.

The registration initiator 354 of the appliance 350 can receive the communication types 360. In some embodiments, the registration initiator 354 can receive the communication types 360 from the appliance manager 314 of the controller 310. In some embodiments, the registration initiator 354 can parse the communication types 360 to identify the application 342 that registered with the controller 310. For example, the registration initiator 354 can parse the communication types 360 to determine the application identifier of the application 342 associated with the communication types 360. Since the application 342 registered with the controller 310, the registration initiator 354 can determine that the controller 310 validated the application 342. Based on the association, the registration initiator 354 can expect to communicate with the application 342 via the communication types 360.

Referring now to FIG. 3D, depicted is a block diagram of the system 300 focusing on the controller 310 provisioning the appliance 350 with the authentication device 340. The appliance manager 314 of the controller 310 can communicate with the application 342 of the authentication device 340. The appliance manager 314 can transmit the authentication code 366A to the application 342, when the appliance manager 314 validates the appliance identifier corresponding to the appliance 350. In some embodiments, the appliance manager 314 can transmit, to the application 342, the authentication code 366A included in the CSR 364. The transmission of the authentication code 366A may be concurrent to installation of the application 342 on the authentication device 340.

The appliance manager 314 can authorize the authentication codes to send to the application 342, upon validating the corresponding appliance identifiers for the authentication codes. In some embodiments, the appliance manager 314 can transmit, to the authentication device 340, multiple authorized authentication codes. For example, the appliance manager 314 can query the mapping database 320 to identify that the authentication device 340 has permission to communicate with multiple appliances. Based on the permissions, the appliance manager 314 can authorize a unique code for each appliance 350 with which the application 342 has permission to communicate. The appliance manager 314 can also transmit information related to the appliance 350 to the application 342. For example, the appliance manager 314 can transmit the appliance identifier of the appliance 350 to the application 342.

The device authenticator 346 of the application 342 can authenticate or authorize the appliance 350. In authenticating appliance 350, the device authenticator 346 can receive the authentication code 366A from the controller 310. In some embodiments, the device authenticator 246 can receive the authentication code 366A responsive to the controller 310 validating the appliance 350 identified in the CSR 364 from the appliance 350. In some embodiments, the authentication device 340 can receive, concurrent to installation of the application 342 on the authentication device 340, a plurality of authentication codes authorized for approving the appliance 350 for provisioning.

The application 342 and the appliance 350 can establish a short-range connection 368 in accordance with at least one of the communication types 360. As depicted, both the authentication device 340 and the appliance 350 can be located at the branch office 330, which allows for the authentication device 340 to be brought within a pairing distance of the appliance 350 to establish the short-range connection 368. In some embodiments, the device authenticator 346 can establish, responsive to receiving the authentication code 366A, the short-range connection 368 with the appliance 350 within a pairing range of the controller application using at least one of one or more communication types 360. On the other hand, device connector 356 of the appliance 350 can establish, in accordance with the communication types 360, the short-range connection 368 with the authentication device 340 within a pairing range of the appliance 350. The short-range connection 368 can be established in accordance with short-range wireless technology communications. The short-range connection 368 may be, for example, Wi-Fi, Wi-Fi Direct, Bluetooth, BLE, or NFC, among others. The pairing range can be a distance between the authentication device 340 and the appliance 350 at which the authentication device 340 and the appliance 350 can establish the short-range connection 368. The range can be between a few centimeters to a 100 meters. The pairing range is associated with the communication types 360. For instance, the pairing range of Bluetooth can be 10 meters, which is greater than the pairing range of NFC which is 20 centimeters.

With the establishment of the short-range connection 368, the device connector 356 of the appliance 350 can determine or generate an authentication code 366B to transmit to the authentication device 340. The authentication code 366B can be a OTA, a numeric code, a hashed key, a token, or any other code. The authentication code 366B may be similar to the authentication code 366A. The application 342 can use the authentication code 366B to authenticate the appliance 350. The device connector 356 of the appliance 350 can transmit the authentication code 366B to the application 342 via the short-range connection 368.

The device authenticator 346 of the application 342 can retrieve, identify, or otherwise receive the authentication code 366B from the appliance 350 via the short-range connection 368. The application 342 can receive the authentication code 366B from the appliance 350 via the short-range connection 368. In some embodiments, the device authenticator 346 can receive an additional authentication code from an additional appliance via another short-range wireless connection with the additional appliance within the pairing range. By receiving different authentication codes from different appliances, the device authenticator 346 can authenticate multiple appliances in the branch office 330.

Upon receipt, the device authenticator 346 can compare the authentication code 366A received from the controller 310 and the authentication code 366B received from the appliance 350. Based on the comparison, the device authenticator 346 can determine whether the authentication code 366A received from the controller 310 matches or corresponds to the authentication code 366B received via the short-range connection 368. When the authentication codes match, the device authenticator 346 can determine that the controller 310 can authenticate the appliance 350 for communication with the controller 310. Conversely, when the authentication codes do not match, the device authenticator 346 can determine that the controller 310 cannot authenticate the appliance 350 for communication with the controller 310.

The device authenticator 346 can generate an authentication result 370 indicate of the determination of the comparison of the authentication code 366A and the authentication code 366B. If the device authenticator 346 determines that the authentication codes match, then the device authenticator 346 can include an approval request in the authentication result 370. The approval request can request the controller 310 sign the certificate for the CSR 364. The device authenticator 346 can generate the approval request to include the device identifier of the authentication device 340 or the appliance identifier of the appliance 350. The device authenticator 346 can generate the approval request to include contextual information, such as a time stamp, communication type 360 used to establish the short-range connection 368, or the authentication codes 366A and 366B compared by the device authenticator 346. Upon generating the authentication result 370, the device authenticator 346 can transmit the authentication result 370 to the controller 310.

In some embodiments, the device authenticator 346 can transmit, responsive to determining that the authentication code 366A corresponds to the authentication code 366B, the approval request to the controller 310 to sign the certificate for the CSR 364 to authorize the appliance 350 to communicate with the controller 310.

Conversely, if the device authenticator 346 determines that the authentication codes do not match, then the device authenticator 346 can include a denial request in the authentication result 370. The denial request can request the controller 310 to restrict signing of the certificate. The device authenticator 346 can generate the denial request to include the device identifier of the authentication device 340 or the appliance identifier of the appliance 350. The device authenticator 346 can generate the denial request to include contextual information, such as a time stamp, communication type 360 used to establish the short-range connection 368, or the authentication codes 366A and 366B compared by the device authenticator 346. Upon generating the authentication result 370, the device authenticator 346 can transmit the authentication result 370 to the controller 310. Conversely, in some embodiments, the device authenticator 346 can transmit, responsive to determining that the authentication code 366A does not correspond to the authentication code 366B, the denial request to the controller 310 to restrict signing of the certificate for the CSR 364 to authorize the appliance 350 to communicate with the controller 310.

The request handler 318 of the controller 310 can retrieve, identify, or otherwise receive the authentication result 370 from the authentication device 340. The request handler 318 can parse the authentication result 370 to identify whether it includes the approval request or the denial request. In some embodiments, the request handler 318 can receive the approval request from the application 342 responsive to the application 342 determining that the authentication code 366A corresponds to the authentication code 366B received via the short-range connection 368. Conversely, the request handler 318 can receive the denial request from the application 342 responsive to the application 342 determining that the authentication code 366A does not correspond to the authentication code 366B received via the short-range connection 368. Additionally, the request handler 318 can also receive, from the application 342, information (e.g., statistics) relating to the authentication device 340 or the appliance 350. For example, the information can include the appliance identifier of the appliance 350, provisioning requests, or firmware version. The request handler 318 can also receive event notifications relating to the appliance 350.

When the authentication result 370 is a denial request, the certificate authority 312 can restrict the certificate for the CSR 364 based on the authentication result 370. The certificate authority 312 can restrict signing of the certificate for the CSR 364 for the appliance 350. In some embodiments, the certificate authority 312 can restrict, responsive to determining that the appliance identifier of the appliance 350 included in the CSR 364 corresponds to another appliance, signing of the certificate for the CSR 364. For example, the certificate authority 312 can restrict signing of the certificate for a rogue appliance that is spoofing the appliance 350. The certificate authority 312 can generate a rejection message responsive to the restriction, and transmit the rejection message to the appliance 350.

The session interface 358 of the appliance 350 can receive, from the controller 310, the rejection message to indicate restriction of signing of the certificate for the CSR 364. The session interface 358 can receive the rejection message responsive to the controller 310 receiving the denial request from the application 342. The denial request can be transmitted by the application 342 responsive to determining that the authentication code 366A received from the appliance 350 from the controller 310 does not correspond to the authentication code 366B received via the short-range connection 368 with the application 342. If the appliance 350 receives the rejection message to the CSR 364 or is otherwise unable to receive the signed certificate 372, then the appliance 350 may not receive the signed certificate 372 from the controller 310.

Conversely, when the authentication result 370 is an approval request, the certificate authority 312 can sign the certificate for the CSR 364. By signing the certificate, the certificate authority 312 can validate the contents of the CSR 364 and confirm the identity of the controller 310 and the appliance 350. In some embodiments, the certificate authority 312 can sign the certificate by adding a digital signature to the certificate. The certificate authority 312 can also sign the certificate by computing a hash of the certificate and encrypting it using a private signing key. The certificate authority 312 can sign the certificate to generate or create a signed certificate 372. The signed certificate 372 can include, for example, the root CA public certificate. In some embodiments, the certificate authority 312 can assign, set, or otherwise determine an expiration time for the signed certificate 372. The expiration time may be relative to a time of issuance. The time of issuance may correspond to a time at which the previous certificate 372 was signed.

By generating the signed certificate 372 responsive to receiving the approval request, the certificate authority 312 can enable the appliance 350 to securely communicate with the controller 310. Upon signing the certificate, the certificate authority 312 can transmit the signed certificate 372 to the appliance 350. In some embodiments, the signed certificate 372 may be sent with an encryption key (e.g., public key) used to generate the certificate 372 as well as the expiration time for the signed certificate 372. In some embodiments, the appliance manager 314 can transmit the signed certificate 372 as part of a response to the CSR 364. The response can include signed certificate 372 to authorize the appliance 350 to communicate with the controller 310.

The session interface 358 can retrieve, identify, or otherwise receive the signed certificate 372 from the controller 310. In some embodiments, the session interface 358 can receive a response including the signed certificate 372 to authorize the appliance 350 to communicate with the controller 310. In some embodiments, the response can include or identify the signed certificate 372 to authorize the session interface 358 to communicate with the controller 310.

The session interface 358 can use the signed certificate 372 for further communication with the controller 310, such as to establish secure communications for the controller 310 to configure or provision the appliance 350. The session interface 358 can use the certificate manager 352 to examine the signed certificate. For example, the certificate manager 352 can parse the signed certificate 372 to identify information about the identity of the controller 310 and the digital signature of the controller 310 that has verified the certificate's contents. If the certificate manager 352 determines that the certificate has a valid signature, then the certificate manager 352 examining the certificate can validate the signed certificate 372. The session interface 358 can use the signed certificate 372 to identify the controller 310 and trust the controller 310 such that the appliance 350 can communicate securely with the controller 310.

In some embodiments, the session interface 358 can also generate a notification message (e.g., a network heartbeat) of the appliance 350 to send or transmit to the controller 310. The notification message can be an approval for provisioning of the appliance 350 by the controller 310. For example, upon receiving the signed certificate 372, the session interface 358 can transmit the notification message as a request for the controller 310 to provision the appliance 350.

In some embodiments, the notification message can override the rejection message, such as if the appliance 350 transmits the notification message from a network administrator or central administrator with override permissions. In some embodiments, the certificate authority 312 signs, responsive to receiving the notification message as an override from the appliance 350, the certificate for the CSR 364. Based on the notification message, the controller 310 can provision the appliance 350. For example, responsive to the notification message, the controller 310 can transmit configuration data to the appliance 350, and install software on the appliance 350.

In some embodiments, the session interface 358 also can receive, from the controller 310, an additional response relating to the signed certificate 372. For example, the certificate authority 312 can determine that the signed certificate 372 is to be renewed. In some embodiments, the certificate authority 312 can identify an existing certificate used by the appliance 350. The certificate authority 312 can determine that an expiration time of the certificate is within a threshold time limit relative to the issuance time. For example, the session interface 358 can receive a renewal or replacement of a previously signed certificate 372 from the controller 310 to authorize the appliance 350 to communicate with the controller 310.

Subsequently, the registration initiator 354 can determine whether to generate another CSR. The subsequent CSR may be generated and sent in a similar manner as described above in conjunction with the CSR 364. In some embodiments, the session interface 358 can determine that the signed certificate 372 is to be renewed. To determine, the certificate manager 352 can compare an expiration time of the signed certificate 372 to a threshold time limit relative to the issuance time. In some embodiments, responsive to determining that the expiration time is past the threshold time limit, the certificate manager 352 can generate another CSR and transmit it to the controller 310 to obtain a renewed or replacement certificate. In some embodiments, the certificate manager 352 can also generate a certificate and transmit the certificate with the CSR to obtain the renewed or replacement certificate.

In some embodiments, the request handler 318 can receive, from the appliance 350, the CSR 364 responsive to the appliance 350 determining that its certificate is to expire within at a certain time. For example, the request handler 318 can receive the CSR 364 if the appliance 350 with the signed certificate 372 determines that a new, renewed, or refreshed certificate is to be requested. The request handler 318 can determine whether to transmit a new certificate to the appliance 350 in a similar manner as described above with respect to the initial certificate 372. If the request handler 318 allows the CSR to refresh the signed certificate, then the request handler 318 can transmit another signed certificate 372 to the appliance 350. For example, if the certificate authority 312 determines that the appliance 350 corresponding to the appliance identifier in the CSR has permission to communicate with the controller 310, then the certificate authority 312 can sign the additional certificate for the additional certificate signature request.

Conversely, the request handler 318 can determine that the appliance identifier included in the CSR 364 corresponds to another appliance previously authorized to communicate with the controller 310, and transmit a rejection message. In some embodiments, the session interface 358 can receive, from the controller 310, the rejection message to indicate restriction of signing of the certificate for the appliance 350, responsive to the controller 310 determining that the appliance identifier included in the CSR 364 corresponds to another appliance previously authorized to communicate with the controller 310. For example, the session interface 358 receives the rejection message if the appliance identifier is associated with different appliances, which can indicate spoofing.

By provisioning the appliance 350 by using the signed certificate 372 that is generated with the involvement of the application 342, the appliance 350 can be provisioned by the controller 310 if the branch administrator associated with the authentication device 340 is available near to the appliance 350. The techniques described herein thus addresses physical security vulnerabilities (e.g., the appliance 350 is stolen) because the application 342 is near the appliance 350 to enable provisioning. For example, the branch administrator using the application 342 can be within the pairing distance of the appliance 350 to establish the short-range connection 368. The branch administrator can authenticate themselves with the controller 310 by using information (e.g., password, pin, authentication methods, etc.) included with the communication types 360 transmitted to the controller 310. By generating the authentication result 370 based on the short-range connection 368, the branch administrator can verify the identity and physical location of the appliance 350. However, the branch administrator may not be equipped with specialized technical skills for provisioning the appliance beyond the basic ability to use the application 342, which installs on the authentication device 340. By relying on the application 342, the appliance 350 also may lack a manufacturer-provisioned certificate, and deep integration between manufacturing and provisioning systems is no longer necessary.

Moreover, the techniques described herein can mitigate the threat of rogue appliances. If a rogue appliance spoofs the appliance identifier of the appliance and sends the registration request to the controller, then the controller can reject the registration request based on detecting duplicate appliances. Even if a rogue appliance spoofs the appliance identifier of the appliance before it is connected and provisioned, then the rogue appliance will not be able to obtaining provisioning without also obtaining physical access to the application 342. However, using the short-range connection 368, such as NFC, to share the authentication code 366B mitigates the risk of rogue users hijacking the connection between the appliance 350 and the authentication device 340.

In addition, the controller 310 can also share the authentication code 366A with the application 342 via secure communications. After the application 342 receives the authentication code 366A from the controller 310 and the authentication code 366B from the appliance 350, it can generate approval request based on determining a match between the authentication codes. The appliance 350 can also manage certificate expiration. Prior to the expiration of the certificate, the appliance 350 can generate a new CSR for an expiring certificate and send it to the controller 310 via a secure channel. The controller 310 can sign the new CSR and transmit the signed certificate 372 to the appliance.

Accordingly, the controller 310 can securely provision appliances with zero touch provisioning. The techniques described herein enable deployment of appliances at scale while addressing security risks because such appliances form a critical part of enterprise networking and security infrastructure, all while providing a user-friendly, mostly automated deployment process that does not necessitate deep technical skills and avoids human error. The controller application does not entail complex technical expertise for performing automatic enrollment and provisioning, thereby improving security. This approach can also be compatible with TPM cryptography hardware block on SD-WAN appliances to deliver a ZTD implementation that is both user-friendly and secure. However, this approach can thus enable ZTD, which is the enrollment and remote provisioning of new appliances on the network without relying on a technical expert on site. Moreover, using the combination of physical proximity between the authentication device 340 and the appliance 350 at the branch office 330, and agent login credentials for the controller 310 can establish end-to-end authentication and trust between the appliance 350 and the controller 310 of a centralized management system.

Now referring to FIG. 4, depicted is a flow diagram of a flow 400 for provisioning the appliance 350 via a zero-touch deployment. Components described in FIGS. 1A, 1B, and 2A-C, and/or the system 300 detailed above can perform the operations and functionalities of the flow 400. Under the flow 400, the controller 310 can generate a certificate (405). For example, the controller 310 can generate the root CA and controller certificate. The controller 310 can generate the Root CA, such as a public or private key, during initiation. The controller certificate can be the public certificate for the controller 310 with respect to the connectivity of the appliance 350. The controller 310 can generate a device configuration (410). The controller 310 can also include configurations for the appliance 350, such as provisioning configurations. The controller 310 can query the mapping database 320 to retrieve a predetermined mapping of applications and appliances managed by the branch administrator. For example, more than one appliance can be mapped to a controller application.

The application 342 can transmit the communication types 360 to the controller 310 (415). The application 342 can be available in an application portal such as a play store, or installed on an authentication device 340 such as a mobile device, smart device, smart phone, smart watch, or any other device that can communicate via short-range wireless technologies such as Wi-Fi, Wi-Fi Direct, Bluetooth, BLE, or NFC. The application 342 can support communications with the appliance 350 via the short-range wireless technologies. By introducing the application 342 to securely use the short-range wireless technologies to enable provisioning of the appliance 350, the application 342 can authenticate the appliance 350. The application 342 can also register short-range wireless technology attributes such as device name and key-pair with the controller 310. The application 342 can use the authentication device 340 to scan a QR code shared by the controller 310 to view statistics of the appliance 350 and to receive event notifications. By scanning the QR code, the application 342 can also securely connect with the controller 310. Additionally, the controller 310 can use the application 342 to view information (e.g., statistics) or receive event notifications relating to the appliance.

The appliance 350 can generate the CSR 364 (420). For example, when a branch administrator connects the appliance 350 to the network 170, the appliance can generate a private key and the CSR. The appliance 350 can use a public CA to verify the controller 310. The appliance can also generate the authentication code 366A. The appliance 350 can transmit the CSR 364 to the controller 310 (425). The CSR 364 can include the authentication code 366A or a registration request. The registration request can include an appliance identifier of the appliance 350.

The controller 310 can transmit application information to the appliance (430). The controller 310 can transmit the application information responsive to validating the appliance identifier of the appliance 350. The application information can include the communication types 360 received from the application 342. The application information can also include short-range wireless technologies supported by the application 342, application name, and key-pair. The controller 310 can transmit a first authentication code (e.g., authentication code 366A) to the application 342 (435). At any time before or after the appliance 350 connects to the network 170, the controller can send the authentication code 366A to the application 342 that is mapped to the appliance identifier of the appliance 350. The controller 310 can also send information (e.g., name, location, support communication technologies) about the appliance 350 to the application 342.

The application 342 can establish a connection (e.g., short-range connection 368) with the appliance 350 (440). After receiving the authentication code 366A, the application 342 can establish short-range wireless technology communications with the appliance 350. The application 342 and the appliance 350 can be located in the branch office 330 to be within a pairing range for establishing the connection. The appliance 350 can transmit a second authentication code (e.g., authentication code 366B) to the application 342 (445). After connecting to the application 342 via the short-range wireless technology, the appliance 350 can send the second authentication code to the application 342. The application 342 can transmit a signature request (e.g., authentication result 370) to the controller 310 (450). The application 342 can compare the authentication code 366A received from the controller 310 to the authentication code 366B received from the appliance 350. If the authentication codes match, then the application 342 can transmit a signature request to the controller 310. The signature request can request that the controller 310 sign the certificate.

The controller 310 can sign the certificate (455). Responsive to receiving the signature request from the application 342, the controller 310 can sign the certificate for the CSR 364 to create or generate the signed certificate 372. The controller 310 can transmit the signed certificate 372 to the appliance 350 (460). The controller 310 can transmit the signed certificate 372 or the Root CA Public Certificate as part of a registration response transmitted to the appliance 350. The controller 310 can also receive a network heartbeat of the appliance 350. The appliance 350 can use the signed certificate 372 for further communication with the controller 310, such as to establish secure communications for the controller 310 to configure or provision the appliance 350.

Figure 5A:
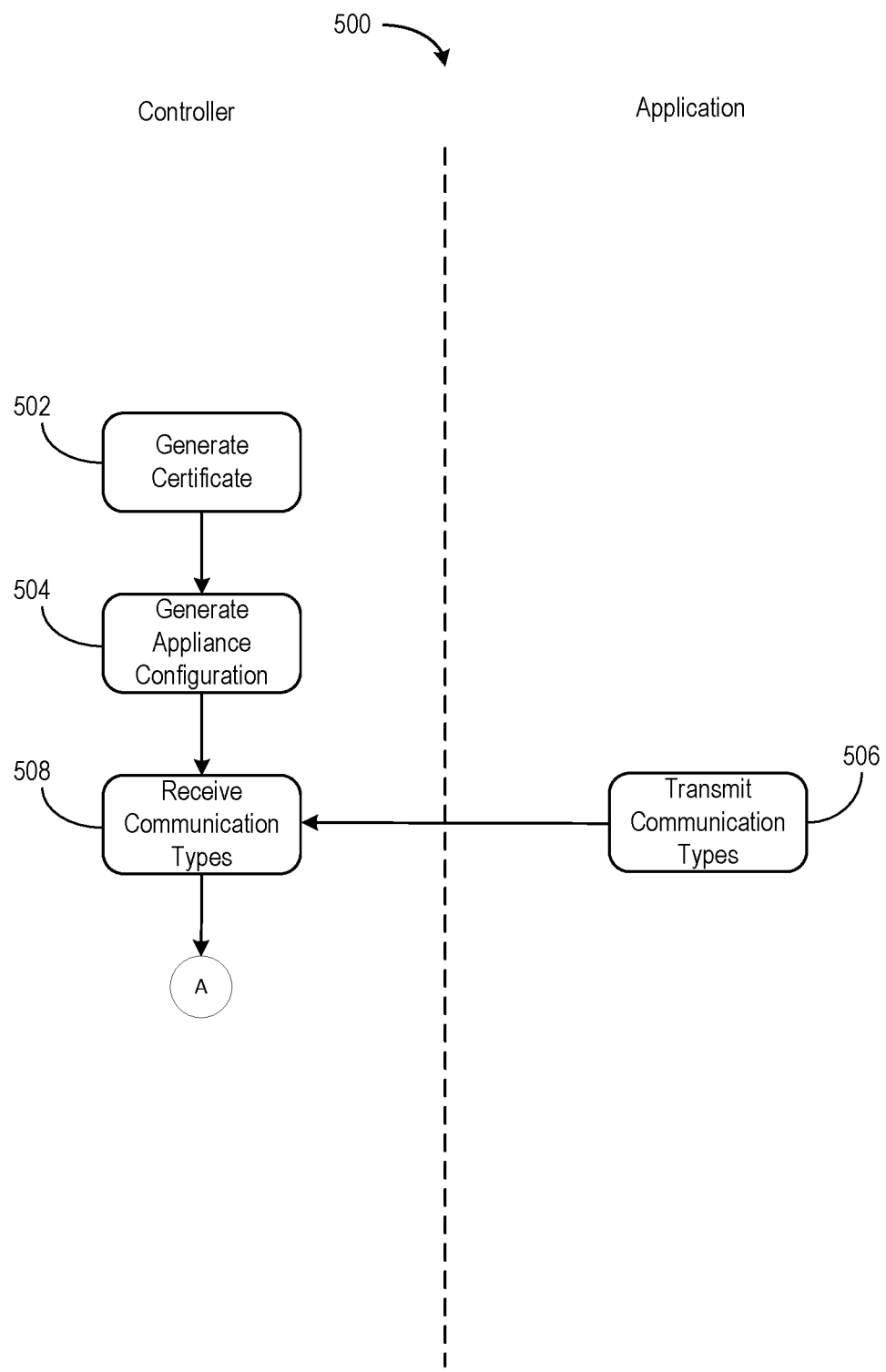
FIGS. 5A-5C is a flow diagram of a method for associating a user experience score with a location of a client in accordance with an illustrative embodiment.
Figure 5B:
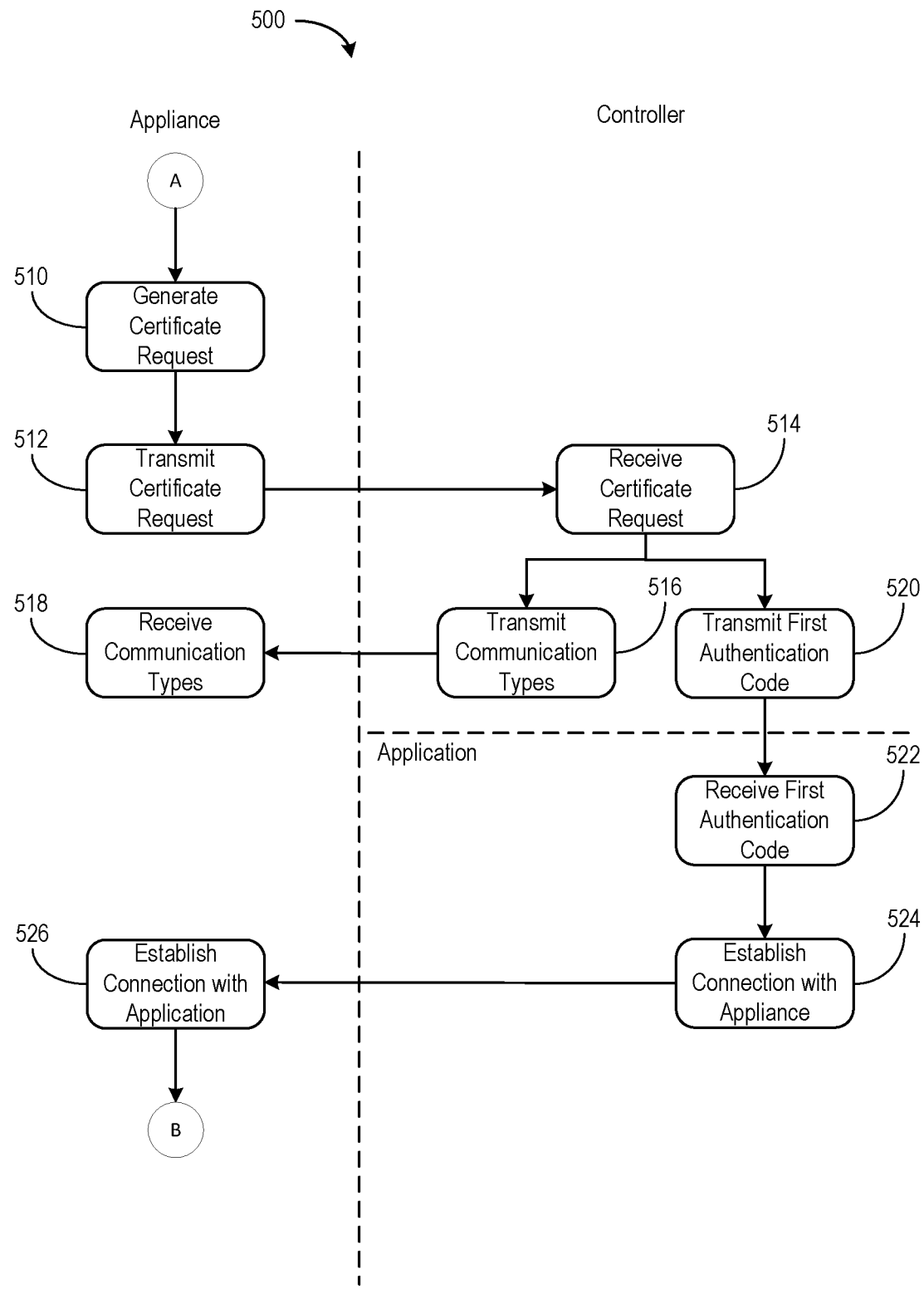
Figure 5C:
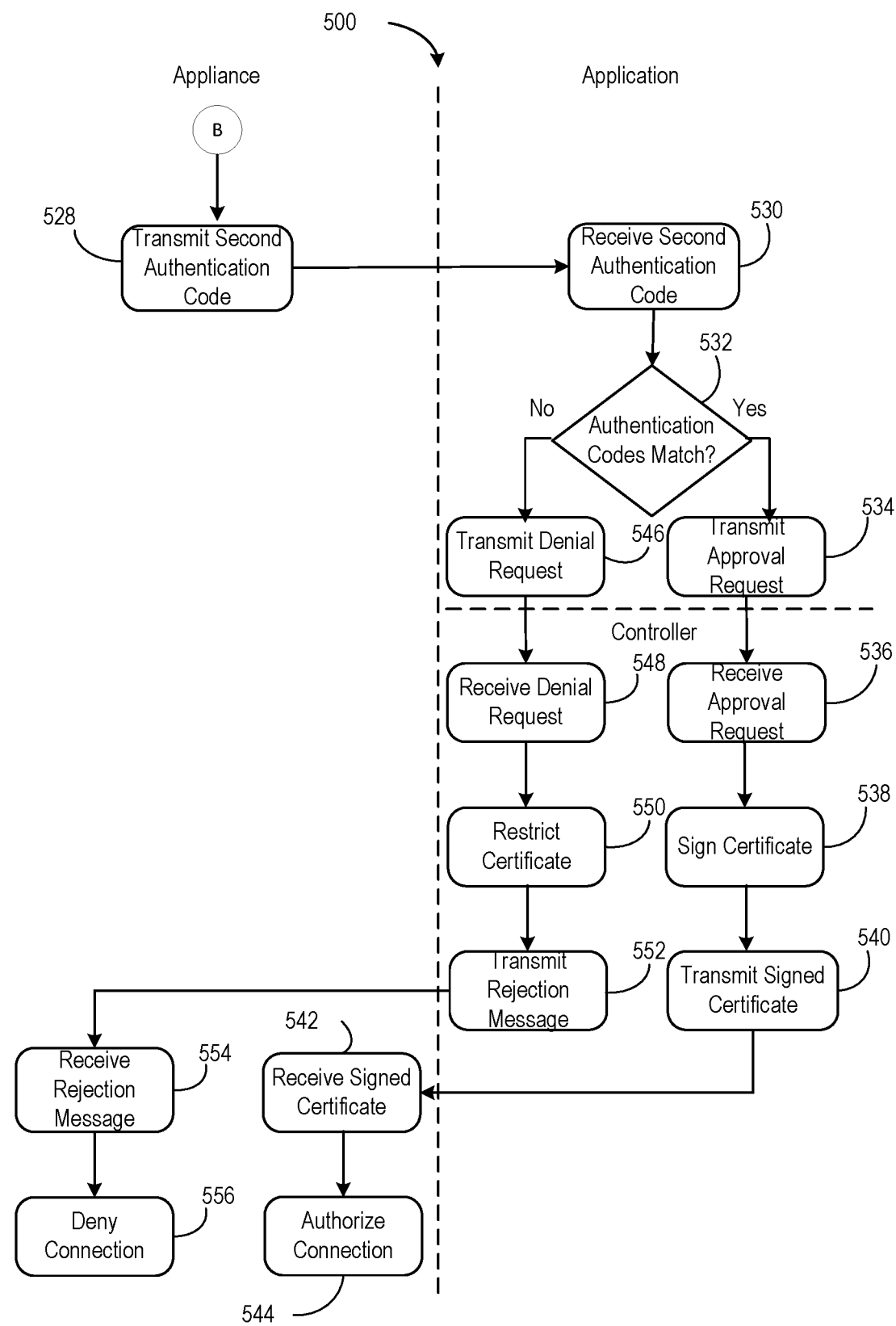

Referring now to FIGS. 5A-5C, depicted is a flow diagram of an embodiment of a method 500 for provisioning appliances securely using zero touch deployments. The components described in FIGS. 1A, 1B, and 2A-C, and/or the system 300 detailed above can perform the operations and functionalities of the method 500. In brief overview, a controller can generate a certificate (502). The controller can generate an appliance configuration (504). An application can transmit communication types (506). A controller can receive the communication types (508). An appliance can generate a certificate request (510). The appliance can transmit the certificate request (512). The controller can receive the certificate request (514). The controller can transmit the communication types (516). The appliance can receive the communication types (518). The controller can transmit a first authentication code (520). The application can receive the first authentication code (522). The application can establish the connection with the appliance (524). The appliance can establish the connection with the application (526). The appliance can transmit the second authentication code (528). The application can receive the second authentication code (530). The application can determine if the first and second authentication codes match (532). If the codes match, the application can transmit an approval request (534). The controller can receive the approval request (536). The controller can sign the certificate (538). The controller can transmit the signed certificate (540). The appliance can receive the signed certificate (542). The appliance can authorize the connection (544). If the codes do not match, the application can transmit a denial request (546). The controller can receive the denial request (548). The controller can restrict the certificate (550). The controller can transmit a rejection message (552). The appliance can receive the rejection message (554). The appliance can deny the connection (556).

The controller (e.g., controller 310) can generate a certificate (502). The controller can generate a Root CA and controller certificate. The controller can generate the Root CA, such as a public or private key, during initiation. The controller can generate CSR private keys and the CSR can be signed by the Root CA (private key). The controller certificate can be the public certificate for the controller with respect to the connectivity of the appliance (e.g., appliance 350).

The controller can generate an appliance configuration (504). The controller can also include configurations for the appliance, such as provisioning configurations. The controller can have a predetermined mapping of controller applications (e.g., application 342) and appliances managed. For example, more than one appliance can be mapped to a particular controller application.

A controller application (e.g., application 342) can transmit communication types (e.g., communication types 360) (506). In some embodiments, the controller application can provide the one or more short-range wireless communication types to the controller for registration. The one or more short-range wireless communication types can identify (i) an appliance identifier corresponding to a second appliance executing the controller application and (ii) an encryption key to apply to the short-range wireless connection between the appliance and the second appliance. In some embodiments, the controller application can acquire a code identifying communication information for connecting with the controller. In some embodiments, the controller application can provide, to the controller via a communication session established in accordance with the communication information identified in the code, one or more short-range wireless communication types for the controller application.

The controller can receive the communication types (508). The controller can receive, from the controller application, one or more short-range wireless communication types for the controller application. In some embodiments, the controller can identify a plurality of appliance identifiers corresponding to a plurality of appliances to be approved via a corresponding plurality of short-range connections with the controller application. In some embodiments, the controller can register the controller application.

An appliance (e.g., appliance 350) can generate a certificate request (e.g., CSR 364) (510). The certificate request can include an appliance identifier of the appliance and a first authentication code (e.g., authentication code 366A). In some embodiments, the appliance can generate a private encryption key to encrypt communications with the controller. The appliance can be configured to initially lack the private encryption key. In some embodiments, the appliance can generate a second certificate to be included in the CSR. The appliance can transmit the certificate request (512). The appliance can transmit, to the controller, the certificate signature request including an appliance identifier of the appliance and the first authentication code. In some embodiments, the appliance can determine that an expiration time of the certificate is within a threshold time limit relative to an issuance time. In some embodiments, the appliance can transmit, to the controller responsive to determining that the expiration time is within the threshold time limit, a second certificate signature request.

The controller can receive the certificate request (514). The controller can receive, from an appliance, the certificate signature request including an appliance identifier of the appliance and the first authentication code. In some embodiments, the controller receiving the certificate signature request can receive the appliance certificate included with the certificate signature request; the certificate generated using the appliance. In some embodiments, the controller can receive, from the appliance, the second certificate signature request including the appliance identifier and the second certificate, responsive to determining that the certificate is to expire within the threshold time limit. In some embodiments, the method 500 can proceed to step (538) if the controller receives, from the appliance, the second certificate signature request including the appliance identifier and the second certificate, responsive to determining that the certificate is to expire within the threshold time limit. In some embodiments, the controller can receive, from the second appliance, the second certificate signature request including the appliance identifier and the second certificate for the controller to sign. In some embodiments, the controller can determine that the appliance identifier included in the second certificate signature request corresponds to the appliance authorized to communicate with the controller. In some embodiments, the method 500 can proceed to step (550) if the controller determines that the appliance identifier included in the second certificate signature request corresponds to the appliance authorized to communicate with the controller.

The controller can transmit the communication types (516). The controller can transmit, to the appliance, responsive to validating the appliance identifier, the one or more short-range wireless communication types with which the appliance is to establish a short-range wireless connection (e.g., short-range connection 368) with the controller application within a pairing range of the controller application. The appliance can receive the communication types (518). The appliance can receive, from the controller, one or more short-range wireless communication types for the controller application registered with the controller responsive to validation of the appliance identifier.

The controller can transmit the first authentication code (520). The controller can transmit, to the controller application, the first authentication code included in the certificate signature request. In some embodiments, can transmit the first authentication code can include transmitting, to the second appliance, concurrent to installation of the controller application on the second appliance, a plurality of authentication codes authorized for the approval request. The application can receive the first authentication code (522). A controller application can receive, the first authentication code from the controller, responsive to the controller validating an appliance identified in the certificate signature request from the appliance. In some embodiments, can receive the first authentication code includes the second appliance receiving, concurrent to installation of the controller application on the second appliance, the plurality of authentication codes authorized for the approval request.

The application can establish the connection (e.g., short-range connection 368) with the appliance (524). The controller application can establish, responsive to receiving the first authentication code, a short-range wireless connection with the appliance within a pairing range of the controller application using at least one of one or more short-range wireless communication types. The appliance can establish the connection (e.g., short-range connection 368) with the application (526). The appliance can establish, in accordance with the one or more short-range wireless communication types, the short-range wireless connection with the controller application within the pairing range of the appliance. The appliance can transmit the second authentication code (e.g., authentication code 366B) (528). The appliance can transmit, to the controller application via the short-range wireless connection, the second authentication code. The application can receive the second authentication code (530). The controller application can receive the second authentication code from the appliance via the short-range wireless connection. In some embodiments, the controller application can receive a third authentication code from the second appliance via a second short-range wireless connection with the second appliance within the pairing range.

The application can determine if the first and second authentication codes match (532). The controller application can determine that the first authentication code received from the controller corresponds to the second authentication code received via the short-range wireless connection. In some embodiments, the method 500 can proceed to step (534) if the controller application determines that the first authentication code received from the controller corresponds to the second authentication code received via the short-range wireless connection. In some embodiments, the controller application can determine that the third authentication code from the second appliance does not correspond to a fourth authentication code for the second appliance received from the controller. In some embodiments, the method 500 can proceed to step (546) if the controller application determines that the third authentication code from the second appliance does not correspond to the fourth authentication code for the second appliance received from the controller.

If the codes match, the application can transmit an approval request (e.g., authentication result 370) (534). The controller application can transmit, responsive to determining that the first authentication code corresponds to the second authentication code, an approval request to the controller to sign the certificate for the certificate signature request to authorize the appliance to communicate with the controller. In some embodiments, transmitting the approval request can include transmitting the approval request to the controller to sign the appliance certificate for the certificate signature request.

The controller can receive the approval request (536). The controller can receive an approval request from the controller application responsive to determining that the first authentication code corresponds to the second authentication code received via the short-range wireless connection. The controller can sign the certificate (538). The controller can sign, responsive to receiving the approval request, the certificate for the certificate signature request to authorize the appliance to communicate with the controller. In some embodiments, signing can include signing, responsive to receiving a notification message from the appliance, the certificate for the certificate signature request. In some embodiments, the controller can sign, responsive to determining that the appliance corresponding to the appliance identifier was previously authorized to communicate with the controller, the second certificate for the second certificate signature request.

The controller can transmit the signed certificate (e.g., signed certificate 372) (540). In some embodiments, signing can include transmitting, a response including the certificate signed to authorize the appliance to communicate with the controller. The appliance can receive the signed certificate (542). The appliance can receive, from the controller, the response including the certificate signed to authorize the appliance to communicate with the controller in response to receiving an approval request from the controller application indicating to the first authentication code corresponding to the second authentication code. In some embodiments, the appliance can receive, from the controller, the response including the certificate signed to authorize the appliance to communicate with the controller responsive to the controller receiving the notification message. In some embodiments, the appliance can receive, from the controller, a second response including the second certificate signed by the controller to authorize the appliance to communicate with the controller.

The appliance can authorize the connection (544). The appliance can authorize communications with the controller to provision the appliance. In some embodiments, the appliance can authorize the communications responsive to receiving the signed certificate. If the codes do not match, the application can transmit a denial request (546). In some embodiments, the controller application can transmit, responsive to determining that the third authentication code does not correspond to the fourth authentication code, the denial request to the controller to restrict signing of the second certificate for the second appliance.

The controller can receive the denial request (548). In some embodiments, the controller can receive the denial request from the controller application responsive to determining that the third authentication code received for the second appliance from the controller does not correspond to the fourth authentication code received via the second short-range wireless connection from the second appliance. The controller can restrict the certificate (550). In some embodiments, the controller can restrict, responsive to receiving the denial request, signing of the second certificate for the second certificate signature request for the second appliance. In some embodiments, the controller can restrict, responsive to determining that the appliance identifier included in the second certificate signature request corresponds to the appliance, signing of the second certificate for the second certificate signature request.

The controller can transmit a rejection message (552). In some embodiments, the controller can transmit the rejection message to indicate restriction of signing of the second certificate for the appliance, responsive to the controller receiving the denial request from the controller application. The controller application can transmit the denial request responsive to determining that the third authentication code received from the appliance from the controller does not correspond to the fourth authentication code received via the second short-range wireless connection with the controller application. In some embodiments, the controller can transmit the rejection message to indicate restriction of signing of the second certificate for the appliance, responsive to the controller determining that the second appliance identifier included in the second certificate signature request corresponds to the second appliance previously authorized to communicate with the controller.

The appliance can receive the rejection message (554). In some embodiments, the appliance can receive, from the controller, the rejection message to indicate restriction of signing of the second certificate for the appliance, responsive to the controller receiving the denial request from the controller application. The controller application can transmit the denial request, responsive to determining that the third authentication code received from the appliance from the controller does not correspond to the fourth authentication code received via the second short-range wireless connection with the controller application. In some embodiments, the appliance can receive, from the controller, the rejection message to indicate restriction of signing of the second certificate for the appliance, responsive to the controller determining that the second appliance identifier included in the second certificate signature request corresponds to the second appliance previously authorized to communicate with the controller. The appliance can deny the connection (556). Without the signed certificate, the appliance can deny connections with the controller for provisioning. Similarly, without the signed certificate, the controller can decline to provision the appliance.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer-readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer-readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of signing a certificate, comprising:
   receiving, by a controller application, a first authentication code from the controller, responsive to the controller validating a device identified in a certificate signature request from the device;
   establishing, by the controller application responsive to receiving the first authentication code, a short-range wireless connection with the device within a pairing range of the controller application using at least one of one or more short-range wireless communication types;
   receiving, by the controller application, a second authentication code from the device via the short-range wireless connection;
   determining, by the controller application, the first authentication code received from the controller corresponds to the second authentication code received via the short-range wireless connection; and
   transmitting, by the controller application responsive to determining that the first authentication code corresponds to the second authentication code, an approval request to the controller to sign a certificate for the certificate signature request to authorize the device to communicate with the controller.

2. The method of claim 1, further comprising:
   receiving, by the controller application, a third authentication code from a second device via a second short-range wireless connection with the second device within the pairing range;
   determining, by the controller application, that the third authentication code from the second device does not correspond to a fourth authentication code for the second device received from the controller; and
   transmitting, by the controller application responsive to determining that the third authentication code does not correspond to the fourth authentication code, a denial request to the controller to restrict signing of a second certificate for the second device.

3. The method of claim 1, further comprising providing, by the controller application, the one or more short-range wireless communication types to the controller for registration, the one or more short-range wireless communication types identifying: (i) a device identifier corresponding to a second device executing the controller application and (ii) an encryption key to apply to the short-range wireless connection between the device and the second device.

4. The method of claim 1, wherein receiving the first authentication code further comprises receiving, by a second device, concurrent to installation of the controller application on the second device, a plurality of authentication codes authorized for the approval request.

5. The method of claim 1, wherein transmitting the approval request further comprises transmitting the approval request to the controller to sign the certificate for the certificate signature request, the certificate generated using a certification authority on the controller.

6. The method of claim 1, further comprising:
acquiring, by the controller application, a code identifying communication information for connecting with the controller; and
providing, by the controller application, to the controller via a communication session established in accordance with the communication information identified in the code, one or more short-range wireless communication types for the controller application.

7. A method of signing a certificate, comprising:
receiving, by a controller from a controller application, one or more short-range wireless communication types for the controller application;
receiving, by the controller from a device, a certificate signature request including a device identifier of the device and a first authentication code;
transmitting, by the controller to the device, responsive to validating the device identifier, the one or more short-range wireless communication types with which the device is to establish a short-range wireless connection with the controller application within a pairing range of the controller application;
transmitting, by the controller to the controller application, the first authentication code included in the certificate signature request;
receiving, by the controller, an approval request from the controller application responsive to determining that the first authentication code corresponds to a second authentication code received via the short-range wireless connection; and
signing, by the controller responsive to receiving the approval request, a certificate for the certificate signature request to authorize the device to communicate with the controller.

8. The method of claim 7, further comprising:
receiving, by the controller, a denial request from the controller application responsive to determining that a third authentication code received for a second device from the controller does not correspond to a fourth authentication code received via a second short-range wireless connection from the second device; and
restricting, by the controller responsive to receiving the denial request, signing of a second certificate for a second certificate signature request for the second device.

9. The method of claim 7, further comprising:
receiving, by the controller from a second device, a second certificate signature request including the device identifier;
determining, by the controller, that the device identifier included in the second certificate signature request corresponds to the device authorized to communicate with the controller; and
restricting, by the controller responsive to determining that the device identifier included in the second certificate signature request corresponds to the device, signing of a second certificate for the second certificate signature request.

10. The method of claim 7, further comprising:
receiving, by the controller from the device, a second certificate signature request including the device identifier, responsive to determining that the certificate is to expire within a time period; and
signing, by the controller responsive to determining that the device corresponding to the device identifier was previously authorized to communicate with the controller, a second certificate for the second certificate signature request.

11. The method of claim 7, wherein signing further comprises:
signing, responsive to receiving a notification message from the device, the certificate for the certificate signature request; and
transmitting, by the controller, a response including the certificate signed to authorize the device to communicate with the controller.

12. The method of claim 7, further comprising generating, by the controller, a certificate using a certification authority on the controller.

13. The method of claim 7, wherein transmitting the first authentication code further comprises transmitting, to a second device, concurrent to installation of the controller application on the second device, a plurality of authentication codes authorized for the approval request.

14. The method of claim 7, further comprising identifying, by the controller, a plurality of device identifiers corresponding to a plurality of devices to be approved via the one or more short-range wireless communication types for the controller application.

15. A system for signing a certificate, comprising:
a device having one or more processors coupled with memory, configured to:
transmit, to a controller, a certificate signature request including a device identifier of the device and a first authentication code;
receive, from the controller, one or more short-range wireless communication types for a controller application registered with the controller responsive to validation of the device identifier;
establish, in accordance with the one or more short-range wireless communication types, a short-range wireless connection with the controller application within a pairing range of the device;
transmit, to the controller application via the short-range wireless connection, a second authentication code; and
receive, from the controller, a response including the certificate signed to authorize the device to communicate with the controller in response to receiving an approval request from the controller application indicating to the first authentication code corresponding to the second authentication code.

16. The system of claim 15, wherein the device is further configured to:
determine that an expiration time of the certificate is within a threshold time limit relative to an issuance time;
transmit, to the controller responsive to determining that the expiration time is within the threshold time limit, a second certificate signature request; and
receive, from the controller, a second response including a second certificate signed by the controller to authorize the device to communicate with the controller.

17. The system of claim 15, wherein the device is further configured to receive, from the controller, a rejection message to indicate restriction of signing of a second certificate for the device responsive to the controller receiving a denial request from the controller application, the denial request transmitted by the controller application responsive to determining that a third authentication code received from the device from the controller does not correspond to a fourth authentication code received via a second short-range wireless connection with the controller application.

18. The system of claim 15, wherein the device is further configured to receive, from the controller, a rejection message to indicate restriction of signing of a second certificate for the device, responsive to the controller determining that a second device identifier included in a second certificate signature request corresponds to a second device previously authorized to communicate with the controller.

19. The system of claim 15, wherein the device is further configured to receive, from the controller, the response including the certificate signed to authorize the device to communicate with the controller responsive to the controller receiving a notification message.

20. The system of claim 15, wherein the device is further configured to generate, using a certificate manager on the device, (i) a private encryption key to encrypt communications with the controller and (ii) a second certificate to be included in the certificate signature request, the device initially configured to lack the private encryption key.

* * * * *